US012698447B2

(12) United States Patent
Coppola et al.

(10) Patent No.: US 12,698,447 B2
(45) Date of Patent: *Aug. 4, 2026

(54) HIGH RATE REACTOR SYSTEM

(71) Applicant: Applied Research Associates, Inc.,
Albuquerque, NM (US)

(72) Inventors: Edward N. Coppola, Panama City, FL
(US); Charles Red, Jr., Youngstown,
FL (US); Sanjay Nana, Panama City,
FL (US)

(73) Assignee: Applied Research Associates, Inc.,
Albuquerque, NM (US)

( * ) Notice: Subject to any disclaimer, the term of this
patent is extended or adjusted under 35
U.S.C. 154(b) by 0 days.

This patent is subject to a terminal dis-
claimer.

(21) Appl. No.: 18/928,792

(22) Filed: Oct. 28, 2024

(65) Prior Publication Data

US 2025/0084322 A1     Mar. 13, 2025

Related U.S. Application Data

(63) Continuation of application No. 14/060,225, filed on
Oct. 22, 2013, now Pat. No. 12,173,239.
(Continued)

(51) Int. Cl.
*C10G 45/04*        (2006.01)
*B01J 3/00*         (2006.01)
(Continued)

(52) U.S. Cl.
CPC .............. *C10G 45/04* (2013.01); *B01J 3/008*
(2013.01); *B01J 19/2405* (2013.01);
(Continued)

(58) Field of Classification Search
CPC ...... C10G 45/04; C10G 29/205; C10G 45/26;
C10G 45/60; C10G 45/68; C10G 47/32;
(Continued)

(56) References Cited

U.S. PATENT DOCUMENTS 5,760,297 A * 6/1998 Weerstra .............. G01N 29/024
73/54.02
5,843,386 A * 12/1998 Makino .................... C10G 1/10
210/205

(Continued)

OTHER PUBLICATIONS

U.S. Appl. No. 19/193,644 Non-Final Office Action issued May 22,
2025.

*Primary Examiner* — Michelle Stein

(74) *Attorney, Agent, or Firm* — Erise IP, P.A.

(57)        ABSTRACT

A process and system for upgrading an organic feedstock
including providing an organic feedstock and water mixture,
feeding the mixture into a high-rate, hydrothermal reactor,
wherein the mixture is rapidly heated, subjected to heat,
pressure, and turbulent flow, maintaining the heat and pres-
sure of the mixture for a residence time of less than three
minutes to cause the organic components of the mixture to
undergo conversion reactions resulting in increased yields of
distillate fuels, higher-quality kerosene and diesel fuels, and
the formation of high octane naphtha compounds. Hydro-
carbon products are cooled at a rate sufficient to inhibit
additional reaction and recover of process heat, and depres-
surizing the hydrocarbon products, and separating the
hydrocarbon products for further processing. The process
and system can include devices to convert olefinic hydro-
carbons into paraffinic hydrocarbons and convert olefinic
byproduct gas to additional high-octane naphtha and/or
heavier hydrocarbons by one of hydrogenations, alkylation,
or oligomerization.

20 Claims, 9 Drawing Sheets

Related U.S. Application Data

(60) Provisional application No. 61/824,167, filed on May 16, 2013, provisional application No. 61/716,636, filed on Oct. 22, 2012.

(51) Int. Cl.

| *B01J 19/24* | (2006.01) |
|---|---|
| *C10G 29/20* | (2006.01) |
| *C10G 45/26* | (2006.01) |
| *C10G 45/60* | (2006.01) |
| *C10G 45/68* | (2006.01) |
| *C10G 47/32* | (2006.01) |

(52) U.S. Cl.
CPC ........ *B01J 19/2415* (2013.01); *C10G 29/205* (2013.01); *C10G 45/26* (2013.01); *C10G 45/60* (2013.01); *C10G 45/68* (2013.01); *C10G 47/32* (2013.01); *B01J 2219/00103* (2013.01); *B01J 2219/00123* (2013.01); *B01J 2219/00132* (2013.01); *B01J 2219/00157* (2013.01); *B01J 2219/00159* (2013.01); *C10G 2300/205* (2013.01); *C10G 2300/206* (2013.01); *C10G 2300/305* (2013.01); *C10G 2300/42* (2013.01); *C10G 2400/02* (2013.01); *Y02P 30/20* (2015.11)

(58) Field of Classification Search
CPC ........ C10G 2300/205; C10G 2300/206; C10G 2300/305; C10G 2300/42; C10G 2400/02; B01J 3/008; B01J 19/2405; B01J 19/2415; B01J 2219/00103; B01J 2219/00123; B01J 2219/00132; B01J 2219/00157; B01J 2219/00159; Y02P 30/20
See application file for complete search history.

(56) References Cited

U.S. PATENT DOCUMENTS

| | | | | |
|---|---|---|---|---|
| 6,066,263 | A * | 5/2000 | Makino ................... | C10B 53/00 210/205 |
| 10,071,322 | B2 | 9/2018 | Coppola et al. | |
| 2008/0099374 | A1 * | 5/2008 | He ........................... | B01J 4/002 208/177 |
| 2010/0329938 | A1 * | 12/2010 | Allan ....................... | B01J 3/008 422/186.01 |

* cited by examiner

Carbon Distribution of Whole Hydrotreated Product

Hydrocarbon Type for Whole Hydrotreated Product of Plant Oil

HIGH RATE REACTOR SYSTEM

CROSS REFERENCE TO RELATED APPLICATIONS

This patent application is a continuation application claiming priority benefit, with regard to all common subject matter, of U.S. patent application Ser. No. 14/060,225, filed Oct. 22, 2013, and entitled "HIGH RATE REACTOR SYSTEM" ("the '225 application"). The '225 application claims priority to U.S. Provisional Patent Application No. 61/716,636, filed Oct. 22, 2012, entitled "HIGH-RATE REACTOR SYSTEM," and U.S. Provisional Patent Application No. 61/824,167, filed May 16, 2013, entitled "CONVERSION OF NAPTHA TO FUEL VIA HIGH-RATE REACTION PROCESS." The above-referenced applications are hereby incorporated by reference in their entirety into the present application.

BACKGROUND OF THE INVENTION

Field of the Invention

The present invention is directed to a high-rate hydrothermal reactor system for converting an organic feedstock into an upgraded fuel product, and more particularly, a continuous-flow high-rate hydrothermal reactor system having a simplified design and a method for upgrading an organic feedstock into an upgraded crude oil product having a lower viscosity, lower specific gravity, lower sulfur, and lower mineral/metals content. The system employs high fluid velocity, high heat transfer rates, and turbulent flow to achieve short residence times.

Description of Related Art

The ever-increasing demand for petroleum products and depleted sources of high value, light crude oil reservoirs have forced refineries to look to alternative hydrocarbon sources and ways to convert and upgrade these sources or feedstocks into viable products. In particular, refineries need processes to upgrade renewable or non-renewable organic feedstocks such as renewable oils, heavy petroleum oil, naphtha, and waxy crude products into hydrocarbons high-value light and middle distillates. As used herein, hydrocarbon molecules may be defined by the number of carbon atoms. For example, any hydrocarbon molecule having eighteen carbon atoms is termed as a C18 and a thirty-six carbon hydrocarbon is termed a C36.

Waxy yellow or waxy black crudes are viscous products that have a high pour point and become semi-solid at lower temperatures, making them difficult to handle and transport. Refining waxy crudes present some challenges and require changes in current refinery operations and equipment. A waxy crude usually consists of a variety of light and intermediate hydrocarbons (paraffins, aromatics, naphthenic, etc.), wax, which primarily consists of paraffin hydrocarbons (C18-C36), known as paraffin wax, and naphthenic hydrocarbons (C30-C60), and a variety of other heavy organic (non-hydrocarbon) compounds such as resins, asphaltenes, diamondoids, mercaptans, organo-metallics, etc.

Conventional petroleum refining involves complex heterogeneous catalytic processes that employ expensive platinum catalysts, multiple reactor stages, require periodic regeneration of the catalyst, and require a feedstock low in metals, sulfur, nitrogen, or oxygen compounds to prevent catalyst fouling. Conventional fluid catalytic cracking (FCC)

processes are also complex, are typically used to crack feedstocks that are heavier than naphtha and form aromatic compounds including benzene.

Various attempts have been made to develop hydrothermal processes for upgrading heavy oils. Several disadvantages of these processes include poor heat transfer, batch or semi-continuous operation, excess gasification, coke formation, mineral precipitation, corrosion, reactor plugging, reaction quenching, and processing of high viscosity fluids. These prior systems typically process the heavy oils at operating temperatures less than 500° C. with residence times ranging from minutes to hours. Many of these prior art systems fail to address the handling of solids resulting from the upgrading process or allow these solids to accumulate in the reactor system. These prior systems also fail to suggest reforming or upgrading of naphtha.

The petroleum industry defines naphtha as the fraction of hydrocarbons in petroleum boiling between 30 and 200° C. It consists of a complex mixture of hydrocarbon molecules generally having between five and twelve carbon atoms (C5-C12) and typically constitutes 15-30% of crude oil, by weight. Naphtha is used primarily as a feedstock for producing high octane gasoline. An octane rating or octane number is a standard measure of the performance of a motor or aviation fuel. The higher the octane number, the more compression the fuel can withstand before detonating. In broad terms, fuels with a higher octane rating are used in high-compression engines that generally have higher performance. Naphtha is also used in the bitumen mining industry as a diluent, the petrochemical industry for producing olefins in steam crackers, and the chemical industry for solvent or cleaning applications. Common products made with naphtha include lighter fluid, fuel for camp stoves, and some cleaning solvents. Light naphtha is also used directly as a blending component in the production of gasoline.

SUMMARY OF THE INVENTION

The present invention is directed to a continuous-flow, high-rate hydrothermal reactor system and a process for upgrading an organic feedstock to upgraded hydrocarbon distillate products. By "upgraded hydrocarbon distillate products" it is meant hydrocarbon products having a higher value and/or improved properties compared to the feedstock. Higher value hydrocarbons include but are not limited to products that exhibit a reduced fraction of gas oil and residuum; reduced asphaltene and metals content; increased yields of naphtha, kerosene, and diesel fuels; increased concentrations of cycloparaffin and aromatic compounds; and lower pour point and viscosity and "drop-in" renewable fuels that are nearly identical to petroleum counterparts and contain cycloparaffin and aromatic compounds. This invention addresses many of the deficiencies of the prior art that include poor heat transfer, batch or semi-continuous operation, long residence time, excess gasification, coke formation, mineral precipitation, corrosion, reactor plugging, and processing of high viscosity fluids. The high-rate reactor of the invention utilizes both high fluid velocity and turbulent flow to achieve very short residence times, such as less than three minutes and effective solids management. The present invention can be used in combination with conventional alkylation or oligomerization processes to convert by-product gas, consisting mostly of C3 and C4 olefins, into additional high-octane naphtha, or other distillate fuels.

In accordance with an embodiment of the present invention, a process for upgrading an organic feedstock comprises providing an organic feedstock and water mixture, feeding the mixture into a high-rate reactor, wherein the mixture is subjected to heat and pressure, maintaining the heat and pressure applied to the mixture for a residence time of less than three minutes. The residence time is an amount of time which is sufficient to cause the organic components of the mixture to undergo conversion reactions that may include, but are not limited to cracking, isomerization, cyclization, reforming, decarboxylation, and dehydration. This residence time can be dependent upon several factors, including the temperature and pressure of the mixture and the particular chemical composition of the feedstock. The process further includes cooling the hydrocarbon products at a rate sufficient to inhibit additional reaction and to enable recovering of process heat, depressurizing the hydrocarbon products, and separating the hydrocarbon products for further processing.

The process can include preheating the organic feedstock and water prior to or after mixing and also pressurizing the mixture to an initial reactor pressure prior to feeding the mixture into the high-rate reactor. According to one embodiment, the organic feedstock and water can be preheated to an initial temperature of 100-400° C. and pressurized to an initial reactor pressure of 1500-6000 psig.

The organic-water mixture can be rapidly heated in the high-rate reactor to a temperature of 400-700° C. This heating can be achieved by either a direct or an indirect heating method and heats the mixture at a rate of 10-50° C./sec. The high-rate reactor can be designed to maintain a turbulent flow of the mixture and achieve Reynolds Numbers of 2000-100,000.

The process can include adding a homogeneous catalyst to the water or organic feedstock to enhance or target specific reactions. This catalyst can be any one or a combination of metal oxides, compounds that form metal oxides, carbonates, sulfates, transition metal salts, and the like.

Various types of organic feedstocks can be upgraded. Examples of the organic feedstocks that can be upgraded, according to the process of the invention, include tar sands bitumen, heavy petroleum crude oil, petroleum crude oil, waxy crude oil, petroleum refinery intermediate streams, synthetic hydrocarbons, pyrolysis oils, coal liquids, renewable oils, and mixtures thereof. Examples of petroleum refinery intermediate streams include atmospheric gas oil, atmospheric tower residuum, vacuum gas oil, vacuum residuum, light hydrocarbons, straight-run naphtha, and other distillates such as straight-run diesel or kerosene or kerosene fractions, and mixtures thereof. Examples of synthetic hydrocarbons which can be processed and upgraded, include hydrocarbons obtained from Fischer-Tropsch processes, alkylation processes, oligomerization or polymerization processes, and biosynthetic processes. The petroleum crude oil can include crude oils exhibiting API (American Petroleum Institute) gravities greater than 22°; heavy crude oils exhibiting API gravities less than 22°; tar sands bitumen; shale oil; and waxy crude oils comprising yellow wax and/or black wax; and mixtures thereof. The renewable organic feedstocks can include plant oil comprising canola, soy bean, Carinata, and castor; waste vegetable oil; corn oil derived from distillers grains; animal tallow; algal oil; microbial oil; terpenes and other pine-related byproducts from tall oils; biosynthetic oils, and mixtures thereof. Other examples of organic feedstocks include natural gas liquids, natural gasoline, petroleum ether, light naphtha, heavy naphtha, kerosene, diesel, atmospheric gas oil, light crude oil, waxy crude oil, and mixtures thereof; that are reformed in the high-rate reactor into highly naphthenic and aromatic distillates, higher-octane naphtha and byproduct reformer gas containing hydrogen that may be used for hydrotreating other product streams.

The process can include additional processing, wherein olefinic byproduct gas can be converted to additional high-octane naphtha and/or heavier hydrocarbons by an alkylation or oligomerization process.

The organic feedstock and water mixture can be fed into and processed in the high-rate reactor in a continuous manner. The volume ratio of water to organic feedstock can be between 1:100 and 1:1.

In accordance with another embodiment of the present invention, a continuous-flow, high-rate, hydrothermal reactor system for upgrading an organic feedstock includes an organic feedstock and water supply, a mixing device for mixing the organic feedstock and water to form a mixture, a pressurizing device for pressurizing the mixture to an initial operating pressure, and a heating device for preheating the mixture. The system further includes a high-rate reactor including an inlet for receiving the pressurized and preheated mixture, the high-rate reactor configured for maintaining the pressurized, pre-heated feed for rapidly heating and pressurizing the mixture for a residence time sufficient to cause a reforming reaction to occur resulting in the formation of a high octane hydrocarbon product and an outlet for emitting the hydrocarbon product. The system also includes a cooling device for rapidly cooling the hydrocarbon product to inhibit additional reactions and to recover process heat, a depressurizing device for reducing the pressure of the hydrocarbon product, and a separation device for separating the hydrocarbon product for further processing.

According to one configuration, the cooling device can include a water pump for quenching the hydrocarbon product to minimize cracking, coking, and gas formation. The system can further include either an alkylation device or an oligomerization device for converting any by-product gases into a usable product. The system can also include a gas-liquid separator for separating the product produced from one of the alkylation device or oligomerization device. According to one embodiment, the system can include a second high rate reactor for reforming the hydrocarbon distillate product and at least one hydrotreater positioned in series or parallel to the second high rate reactor. The hydrogen-rich reformer gas from the second high rate reactor can be used in the least one hydrotreater.

DETAILED DESCRIPTION OF THE INVENTION

Figure 1:
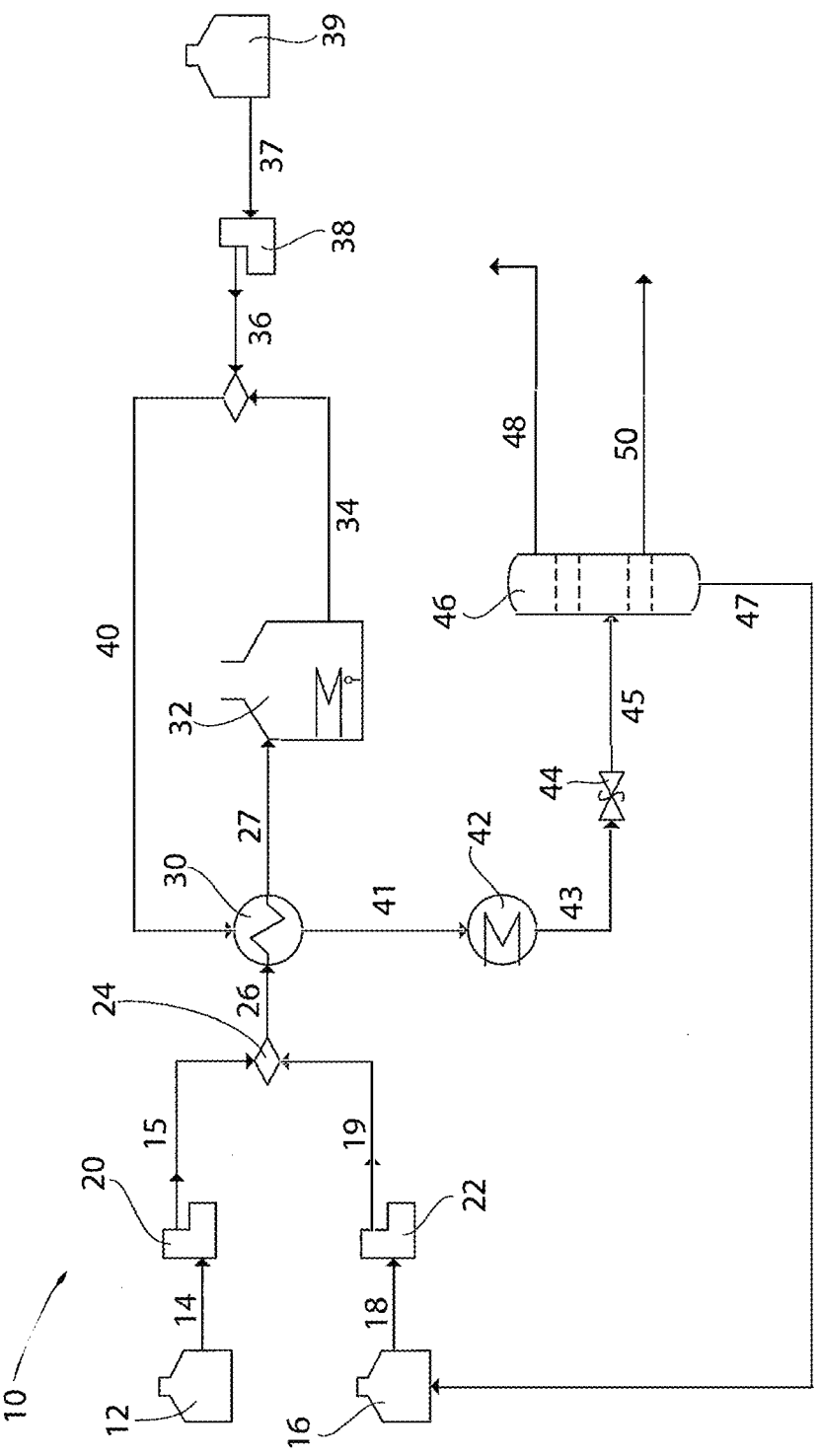
FIG. 1 is a schematic view of the high-rate reactor system using direct heat in accordance with an embodiment of the present invention.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. For example, while the invention has been described in terms of "a" polyester stabilizer, "an" ethylenically unsaturated monomer, "an" organic solvent, and the like, mixtures of these and other components, including mixtures of microparticles, can be used. Also, as used herein, the term "polymer" is meant to refer to prepolymers, oligomers and both homopolymers and copolymers; the prefix "poly" refers to two or more. When ranges are given, any endpoints of those ranges and/or numbers within those ranges can be combined with the scope of the present invention. "Including", "such as", "for example" and like terms means "including/such as/for example but not limited to".

For purposes of the description hereinafter, the terms "upper", "lower", "right", "left", "vertical", "horizontal", "top", "bottom", "lateral", "longitudinal", and derivatives thereof, shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. When ranges are given, any endpoints of those ranges and/or numbers within those ranges can be combined with the scope of the present invention. "Including", "such as", "for example" and like terms means "including/such as/for example but not limited to".

It should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

The present invention is directed to an improved feedstock upgrading process that utilizes a high-rate reactor system to improve reactor fluid dynamics and achieve higher operating temperatures such as operating temperatures between 400 and 700° C. Because the system of the invention operates at temperatures much higher than the prior art systems, the reaction rate is greatly increased and the residence time and reactor size are reduced. However, as the reaction temperature is increased, the potential for coke formation and gasification also increases. The high-rate reactor system of the invention mitigates the effects of high temperature operation by employing a combination of features. One of these features includes management of water concentration to mitigate coke formation. The high-rate reactor process of the present invention utilizes water-to-organic volume ratios between 1:100 and 1:1, such as between 1:10 and 1:1. Another feature is the use of rapid heating of the contents to the reaction temperature. Typical heating rates may range from 10 to 50° C. per minute. Yet another feature employed is the use of high pressure to mitigate excessive cracking and gas formation. The high-rate reactor is operated at a pressure in the range of 1500-6000 psig, such as in the range of 2000-3500 psig. The high-rate reactor also utilizes the feature of turbulent flow to optimize mixing, maximize heat transfer, minimize reactor fouling, and suspend solids that form or precipitate. Yet another feature includes the use of a short residence time to minimize secondary cracking and coke formation. Superficial residence times from 1 to 120 seconds may be employed. Superficial residence time is synonymous with "space time" and is commonly used in relation to flow reactors where reactions or phase changes occur within the reactor. Space time is defined as the time necessary to process one reactor volume of fluid based on entrance conditions (standard temperature and pressure). A superficial residence time of 1 to 120 seconds converts to an actual residence time of approximately 0.1-10.5 seconds.

The conversion of space time or superficial residence time to actual residence time is discussed in below.

According to the Oxford Dictionary of Chemical Engineering, Oxford University Press 2014, First Edition 2014, pg. 352, space time is commonly represented by the Greek letter tau "$\tau$", and is obtained by dividing the reactor volume by the volumetric flow rate entering the reactor.

Superficial residence time, or space time=$\tau$=$V/V_0$:
Where:
$V$=the volume of a flow reactor and
$V_0$=the total volumetric flow rate at inlet conditions.

Residence time is the duration of a substance within a process item [reactor] or equipment. (Oxford Dictionary of Chemical Engineering, Oxford University Press 2014, First Edition 2014, pg. 325).

Both superficial residence time (or space time) and actual residence time for a reactor of a given volume depend on the density of the fluid. In the case of superficial residence time, or space time, the density of the fluid at entrance conditions is used, which is typically ambient conditions (one atmosphere of pressure and 25° C.). However, the actual residence time in a reactor is determined by the actual density or specific volume (1/density) of the fluid in the reactor.

This can be illustrated by an example where the superficial residence time, or space time, and reactor volume is kept constant and compare to the actual residence time at reactor conditions.

Superficial Residence time based on entrance conditions: Pressure=1 atmosphere; Temperature=25° C.

| | Volumetric flow rate (vo), L/min | Fluid density at entrance conditions, kg/L | Mass flow rate, kg/min | Reactor Volume (V), L | Space time, min | Space time, sec |
|---|---|---|---|---|---|---|
| Water | 1 | 1 | 1 | | | |
| Oil | 2 | 0.9 | 1.8 | | | |
| Total | 3 | | 2.8 | 9 | 3 | 180 |
| Higher | 4.5 | | 4.2 | 9 | 2 | 120 |
| volumetric | 9 | | 8.4 | 9 | 1 | 60 |
| flow rates | 54 | | 50.4 | 9 | 0.17 | 10 |
| | 540 | | 504 | 9 | 0.02 | 1 |

Actual Residence time based on reactor conditions: Pressure=~3400 psig, Temperature=~500° C.

| Space time, sec | Mass flow rate, kg/min | Specific volume at reactor conditions, L/kg | Volumetric feed rate at reactor conditions, L/min | Reactor Volume (V), L | Actual Residence time, min | Actual Residence time, sec |
|---|---|---|---|---|---|---|
| 180 | 2.8 | 12.2 | 34.16 | 9 | 0.263 | 15.8 |
| 120 | 4.2 | 12.2 | 51.24 | 9 | 0.176 | 10.5 |
| 60 | 8.4 | 12.2 | 102.48 | 9 | 0.088 | 5.3 |
| 10 | 50.4 | 12.2 | 614.88 | 9 | 0.015 | 0.9 |
| 1 | 504 | 12.2 | 6148.8 | 9 | 0.001 | 0.1 |

Density 82.1 kg/m3

Specific volume 0.0122 m3/kg

For the same mass flow rate and reactor volume the superficial residence time, or space time is 120 seconds, but the actual residence time is only ~10.5 seconds. This assumes that the density and specific volume of the material in the reactor is the same as supercritical water at reactor conditions. This is a good assumption because the process fluid is a single phase where feed oil and lower molecular weight gaseous and cracked product are dissolved in supercritical water.

Finally, rapid quenching may be employed to minimize secondary cracking, coke formation, undesirable secondary reactions, and corrosion.

The high-rate reactor operates at a temperature of 400-700° C. to increase cracking, isomerization, reforming, dehydrocyclization, and dealkylation rates and achieve a very short residence time, but at a temperature much lower than utilized in conventional steam cracking reactors. By operating at lower temperatures than conventional steam cracking reactors, the present invention minimizes gas and coke formation. It can be appreciated that optimal conversion conditions are dependent on feedstock quality and operating conditions can be varied to achieve the desired product yield and chemistry. For example, when processing high-molecular-weight feedstocks, operating conditions can be varied to maximize the yield of diesel, kerosene, or naphtha, or to control the degree of cyclization and aromatization. Also, naphtha reforming conditions can be varied to control octane number or benzene concentration in the reformate product.

In one embodiment, the high-rate reactor is a tubular reactor, with the inside diameter of the tube or tubes designed to maintain a turbulent flow of the mixture throughout a reaction zone. Turbulent flow occurs at a high Reynolds Number, i.e., the measure of the ratio of inertial force to viscous forces, and is dominated by inertial forces, which tend to produce chaotic eddies, vortices, and other flow instabilities. A high Reynolds Number results in a high heat transfer rate, intimate mixing, and reduces the rate of reactor fouling. The present invention employs a combination of a short residence time and a high Reynolds Number (Re) within the range of 2000-100,000 or even higher than 100,000 throughout the reaction zone.

A water quench may be directly injected into the reactor effluent to rapidly cool the product stream by 100-200° C. and terminate reforming and/or cracking reactions. This water quench can also provide additional diluent to maintain solids in suspension. Terminating and/or inhibiting additional reaction in the reactor effluent may be accomplished via quenching or other known processes, which are performed to cool the reactor product at a cooling sufficient to inhibit additional reactions.

Reference is now made to FIG. 1, which shows a schematic view of the high-rate reactor system, generally indicated as 10, using direct heat for upgrading an organic feedstock into higher-value fuel products. The organic feedstock can be one or more of the following: tar sands bitumen; heavy petroleum crude oil; petroleum crude oil; waxy crude oil; petroleum refinery intermediate streams; synthetic hydrocarbons; pyrolysis oils; coal liquids; renewable oils; and mixtures thereof. The petroleum crude oil can include crude oils exhibiting API gravities greater than 22°; heavy crude oils exhibiting API gravities less than 22°; tar sands bitumen; shale oil; and waxy crude oils comprising yellow wax and/or black wax; and mixtures thereof. The petroleum refinery intermediate streams include atmospheric gas oil, atmospheric tower residuum, vacuum gas oil, vacuum residuum, light hydrocarbons, straight-run naphtha, kerosene, diesel distillates, or mixtures thereof. The synthetic hydrocarbons can include hydrocarbons obtained from Fischer-Tropsch processes, alkylation processes, oligomerization processes, polymerization processes, and/or biosynthetic processes. The renewable organic feedstocks can include plant oil comprising canola, soy bean, Carinata, and castor; waste vegetable oil; corn oil derived from distillers grains; animal tallow; algal oil; microbial oil; terpenes and other pine-related byproducts from tall oils; biosynthetic oils, and mixtures thereof. Other examples of organic feedstocks include natural gas liquids, natural gasoline, petroleum ether, light naphtha, heavy naphtha, kerosene, diesel, atmospheric gas oil, light crude oil, waxy crude oil, and mixtures thereof; that are reformed in the high-rate reactor into highly naphthenic and aromatic distillates, higher-octane naphtha and byproduct reformer gas containing hydrogen that may be used for hydrotreating other product streams.

In embodiments that use feedstocks such as heavy oils, tar sands bitumen, and similar feedstocks that contain hydrogen deficient compounds such as polycyclic aromatics and contain metals and other inorganic constituents, these feedstocks can undergo one or more reactions that include cracking, ring opening, isomerization, hydrogenation, and demetalization. The high-rate reactor system of the invention can operate without the addition of any external catalysts or external hydrogen. However, according to some embodiments, homogeneous catalysts can be added to the water or organic feedstock to enhance or target specific reactions such as hydrogenation, cracking, or decarboxylation. These catalysts may include metal oxides, or compounds that form metals, or metal oxides at process conditions, carbonates, sulfates, and transition metal salts. The ideal catalyst will stay in solution in the subcritical water product and be recycled with the process water. Alternatively, catalysts that form nano-particles at supercritical water conditions may be physically separated using conventional gravity settling, filtration, hydrocyclone, or similar processes to recover the catalyst, which may be converted back to a salt and reused.

Referring again to FIG. 1, a high rate reactor system and process 10 using direct heating in accordance with an embodiment of the invention includes an organic supply reservoir 12 for supplying an organic feedstock 14 and a water supply reservoir 16 for supplying a water feed 18.

The organic feedstock 14 and water feed 18 are pumped via separate feed pumps 20, 22, in a selected proportion (i.e., 1:100-1:1, water to organic feedstock, by volume) to form a pressurized organic stream 15 and pressurized water stream 19. The streams 15, 19 are mixed together at 24 to form an organic and water mixture feed stream 26. According to one embodiment, depending upon the viscosity and/or pour point of the particular organic feedstock being processed, it may be necessary to provide a preheater for the organic feedstock 14 and/or a preheater for the water feed 18. It can be appreciated that certain organic feedstocks will not require a preheating step. Depending upon the particular physical characteristics of the feedstock 14, the preheating occurs at a temperature that is sufficient to reduce the viscosity of the feedstock 14 to facilitate mixing and pumping of the feedstock 14. It can be appreciated that this preheating can be accomplished by conventional systems including steam, hot oil, electricity, heat exchangers, waste heat recovery from process streams, and the like. The feed pumps 20, 22 can pressurize the organic and water mixture feed stream 26 to the initial system operating pressure. According to one embodiment, the initial reactor pressure of the organic and water mixture feed stream 26 can be pressurized by the feed pumps within the range of 1500-6000 psig. It can be appreciated that most organic feedstocks become miscible with water at, or above, supercritical water conditions. Mixing can be provided using any known type of mixer such as a high-shear, mechanical, sonic, cavitation device, and the like. According to one embodiment, the organic and water mixture feed stream 26 can be in the form of an emulsion or small-droplet dispersion. The water feed 18, well-mixed in the selected proportion with the organic feedstock 14, minimizes coke formation, secondary cracking, and gas formation. Also, proper proportioning of the organic feedstock 14 with the water feed 18 accelerates the dissolution of the water-oil mixture and promotes desirable conversion reactions.

The feed stream mixture 26 can be further heated in one or more feed-effluent heat exchangers 30 to form a heated high-pressure feed stream mixture 27. This feed stream mixture 27 is heated to a temperature that is below the condition at which conversion reactions are initiated, which is typically at a temperature less than 400° C., such as within the range of 100-400° C.

The heated, high-pressure, feed stream mixture 27 then flows into the high-rate reactor 32. In one embodiment, when the heated high pressure feed stream mixture 27 enters the high-rate reactor 32, it is rapidly heated at a rate of 10-50° C. per second to its reaction temperature and is rapidly converted to more desirable distillate products. The heat and pressure are maintained within the high-rate reactor 32 for a residence time which is sufficient to cause the organic components of heated high pressure feed stream mixture 27 to undergo reactions resulting in the formation of higher-value hydrocarbon products. In one embodiment, the residence time is less than three minutes (actual residence time of approximately 15.8 seconds, which is less than approximately 18 seconds or even less than approximately 16 seconds), such as 10-120 seconds (actual residence time of approximately 0.9-10.5 seconds), or 1-60 seconds (actual residence time of approximately 0.1-5.3 seconds).

According to the embodiment shown in FIG. 1, the heating can be accomplished by the application of direct heat such as by the use of direct fired or electrical heaters. It can be appreciated that all of the process variables such as temperature, pressure, water to organic weight ratio, and residence time can be controlled to achieve the desired degree of conversion. The high-rate reactor 32 maintains a high Reynolds Number (i.e., high velocity and turbulent flow) to maximize heat transfer resulting in very short residence times and maintains in suspension any solids that may form.

According to the embodiment shown in FIG. 1, product 34 exiting from the high-rate reactor 32 can be cooled or immediately quenched by injecting a pressurized water stream 36 via pump 38 which is connected in series with water source 39 supplying water 37. Quenching of the product 34 terminates the conversion reactions and minimizes secondary cracking, coking, and gas formation. Quenching can be achieved by one or a combination of two or more methods including adiabatic expansion, water injection, or heat exchange. For example, the water injection ratio (volume ratio of water to quenched product) for quenching can be between 1:10 and 2:1, such as between 1:5 and 1:2. The quenched product 40 can pass through the one or more feed-effluent heat exchangers 30 (or other heat exchanger) to further cool the product 40. The cooled product 41 from the feed-effluent heat exchanger 30 can be further cooled, using a product cooling heat exchanger 42, to the temperature suitable for a first separation. The pressure of the cooled product 43 can be reduced using conventional depressurizing mechanical devices 44 such as valves, orifices, capillaries, and the like to form the depressurized product steam 45.

Upgrading of certain types of feedstocks can create a corrosive environment at intermediate temperatures during product cool-down in a feed-effluent heat exchanger. Product quenching will reduce the zone of corrosivity. Capillary pressure letdown may be employed to reduce product pressure while maintaining solids in suspension. Adiabatic expansion of the product through a capillary or an orifice into a flash drum or similar device may be employed to avoid problems associated with pressure letdown of a stream containing solids, permit recovery of volatile hydrocarbons and water, and provide a mechanism to reject inorganic solids, coke, and asphaltenes.

The depressurized product stream 45 is then fed into a separator 46, such as a multiphase separator, where it is separated into water 47 and the products of reaction, such as, but not limited to, fuel gas 48 and organic liquid product 50. The reaction products 48, 50 can include two or more fractions containing (only two illustrated for simplicity here) non-condensable gases, condensable vapors, organic liquid, aqueous product, and solids. It can be appreciated that the reaction products 48, 50 can be separated by one or more operations including high-pressure separators, low-pressure separators, two and three-phase separators, flash drums, flash distillation, strippers, fractionators, condensers or heat exchangers, gravity separators, filtration devices, and the like.

The separated water 47 can be treated if necessary and recycled into the water supply 16. Alternatively, the separated water 47 can be fed to water source 39 and used as quenching water 37. By way of example, the products of reaction can be separated into a fuel gas 48 and an upgraded organic product or distillate oil 50. The fuel gas 48 can be recovered for further processing to recover valuable constituents such as hydrogen, ethane, ethylene, propane, propene, butane, butane, or isobutene/butane. Either treated or untreated fuel gas can be used to provide process heat and/or electricity via cogeneration. The upgraded organic product or distillate oil 50 is suitable for further processing into finished fuels or chemicals. This further processing can include hydrotreating, hydroisomerization, and fractionation. Byproducts may be generated from feedstocks that possess high inorganic content, high asphaltenes content, or both. These byproducts can be separated from the organic liquid product or distillate oil 50 and further processed by separation operations or thermal treatment operations such as coking.

Figure 2:
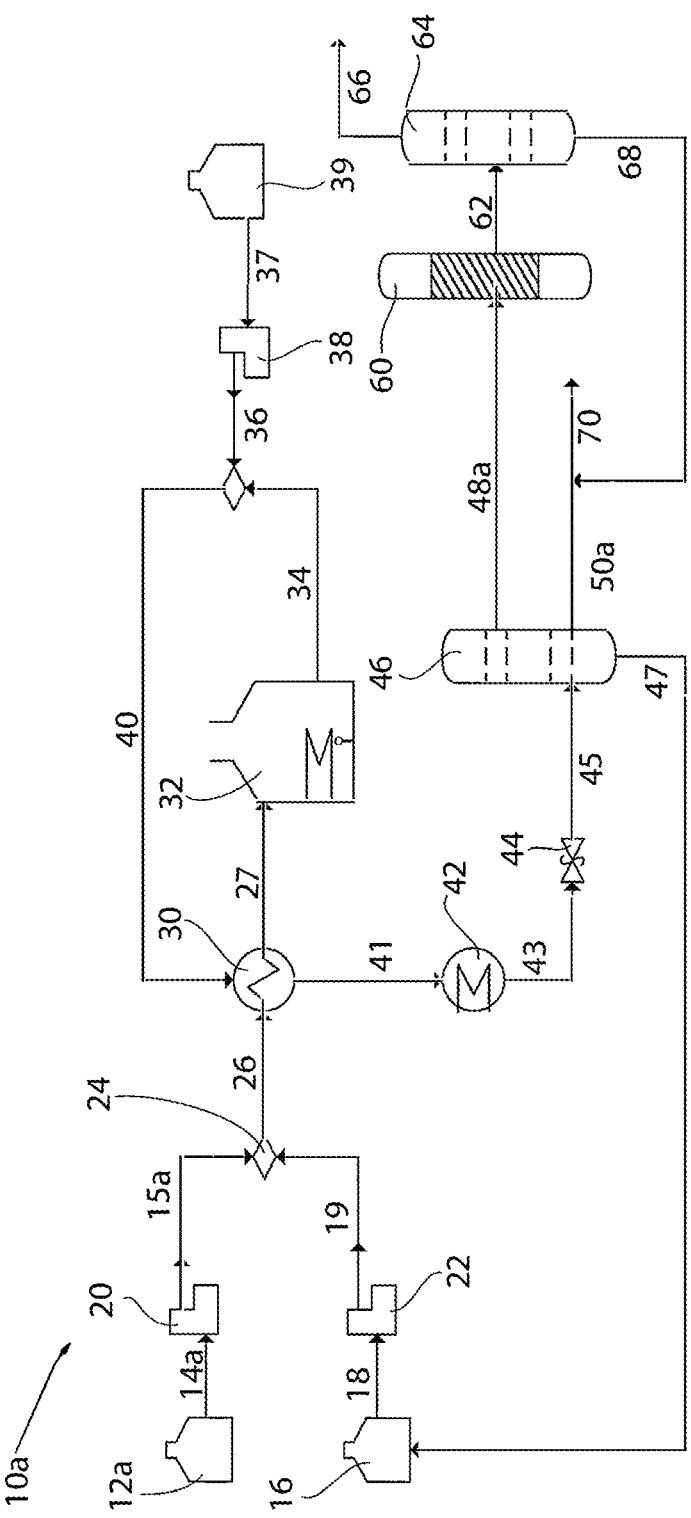
FIG. 2 is a schematic view of the high-rate reforming reactor system with alkylation as an embodiment of the present invention.

Reference is now made to FIG. 2, which shows a schematic view of the high-rate reactor system, generally indicated as 10a, using direct heat for reforming an organic feedstock into a higher value product, such as high octane naphtha. This system is similar to the high-rate reactor system 10, described in FIG. 1, but includes an optional alkylation process to optimize liquid product yield and maximize the octane value of the naphtha product. This system is similar to the high-rate reactor system 10 as shown in FIG. 1 and where like reference numbers are used for identifying like components. The organic feedstock 14a for the reformer embodiment of this invention is typically a naphtha-type material, which is supplied via naphtha supply reservoir 12a and pressurized via pump 20 to form a pressurized naphtha stream 15a. The organic feedstock 14a can also be one or more of the following: light crude oil, (API gravity over about) 35-40° waxy crude oil; natural gas liquids or natural gasoline; petroleum refinery intermediate streams; synthetic hydrocarbons; and renewable oils. The petroleum refinery intermediate streams include atmospheric gas oil, vacuum gas oil, light and heavy naphtha, kerosene, or diesel distillates. The synthetic hydrocarbons can include hydrocarbons obtained from Fischer-Tropsch processes, alkylation processes, oligomerization processes, polymerization processes, and/or biosynthetic processes.

All process variables (temperature, pressure, water:oil ratio, and residence time) are controlled to achieve the desired degree of reforming. Primary reforming reactions observed include conversion of n-paraffins, isoparaffins, n-olefins, and isoolefins to naphthene (alkyl cycloparaffin) and aromatic (alkyl benzene) compounds. Additional reactions observed include cracking of n-paraffins, isoparaffins, n-olefins, and isoolefins; dehydrogenation of napthenes to aromatic compounds, and dealkylation of alkyl cycloparaffin and alkyl benzene compounds.

In one embodiment, the naphtha fraction of the reformed liquid product 50a exiting separator 46 is a high-octane gasoline blend stock that exhibits lower n-paraffin content and higher cycloparaffin, aromatic, and olefin content than the feedstock 14a.

Reformer gas 48a produced during reforming exhibits high hydrogen content and may be used as a source of hydrogen for hydrotreating other distillate products to remove sulfur or saturate olefins. Reformer gas 48a produced during reforming also contains high concentrations of C3 and C4 olefins. These olefins can be converted to highly-branched, high-octane naphtha by alkylation processes in the alkylation reactor 60. Alkylation products 62 are separated in a gas-liquid separator 64 to form residual fuel gas 66 and high-octane alkylate product 68. The alkylate product 68 may be added to the reformed liquid product 50a to form the final high-octane naphtha product 70. The ability to recover and liquefy byproduct gas not only results in higher octane naphtha and higher quality kerosene and diesel, but also higher liquid product yields.

Figure 3:
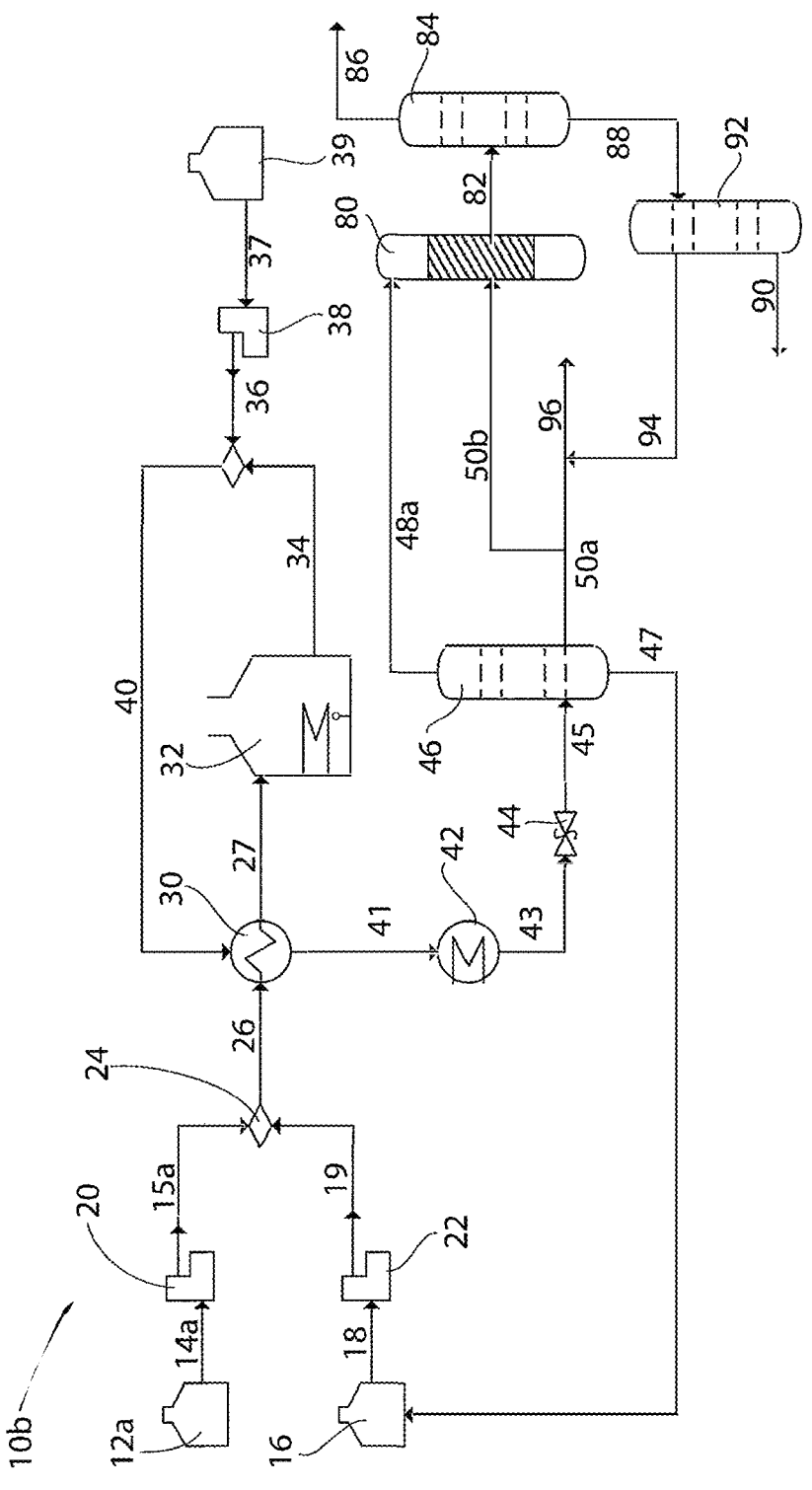
FIG. 3 is a schematic view of the high-rate reforming reactor system with oligomerization as an embodiment of the present invention.

Reference is now made to FIG. 3 which shows a schematic view of the high-rate reactor system generally indicated as 10b, using direct heat for reforming an organic feedstock into high octane naphtha and higher hydrocarbons. This embodiment is similar to the high-rate reactor system 10a described in FIG. 2, where like reference numerals are used for identifying like components. The high-rate reactor system 10b of FIG. 3 integrates an optional oligomerization process via oligomization reactor 80, designed to optimize liquid product yield and maximize the octane value of the naphtha product. In addition to C6, C7, and C8 branched hydrocarbons that are produced by conventional alkylation; trimers, tetramers, and higher hydrocarbons are formed during oligomerization. Alternatively, olefinic product gases can be reacted with benzene and other low molecular weight olefins and aromatic compounds in the organic liquid product to form higher-molecular-weight alkyl benzene, alkyl cycloparaffin, and isoparaffin molecules using conventional oligomerization processes.

With continuing reference to FIG. 3, in this embodiment a fraction 50b of the reformed naphtha product 50a exiting the separator 46 can be further processed in the oligomerization reactor 80. The naphtha product fraction 50b is co-processed with reformer byproduct gas 48a that contains olefinic hydrocarbons to produce an oligomerized product 82. The oligomerized product 82 is fed into a gas-liquid separator 84 where fuel gas 86, that has been depleted of olefinic hydrocarbon gasses, is separated from the oligomerized product 82 to form naphtha fraction 88. If the oligomerization reactor is operated in a manner to produce higher hydrocarbons, the naphtha fraction 88 can be separated from higher hydrocarbons 90 in a naphtha separator 92 to form naphtha product 90. The higher hydrocarbons 90 from the naphtha separator 92 can be recycled to the high-rate reformer 32 where they will undergo additional cracking and reforming reactions resulting in additional production of high octane naphtha. The oligomerized naphtha product 94 from the naphtha separator 92 can be combined with the reformed high-octane naphtha 50a to form the final high-octane naphtha product 96.

Figure 4:
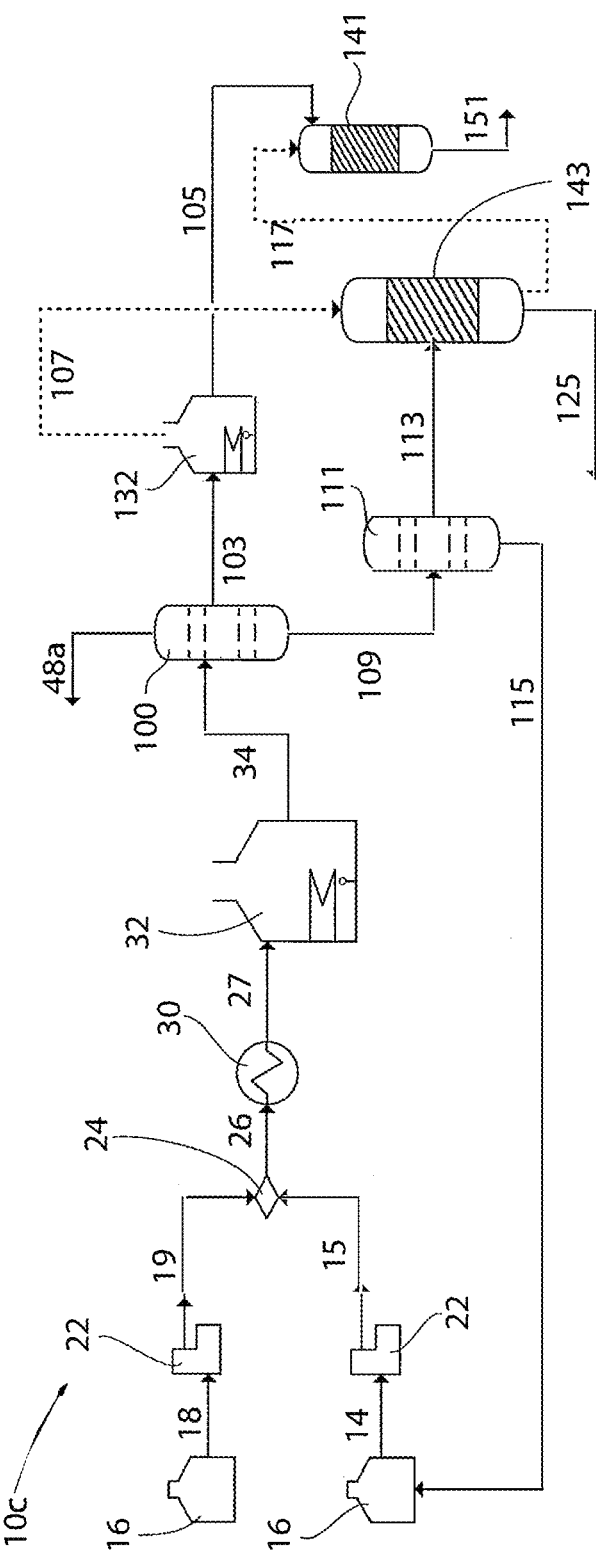
FIG. 4 is a schematic view of the integrated high-rate reforming reactor system with hydrotreating as an embodiment of the present invention.

Reference is now made to FIG. 4 which shows a schematic view of the integrated high-rate reactor reformer system with hydrotreating generally indicated as 10c. This embodiment of the present invention can upgrade any petroleum, synthetic, or renewable feedstock previously discussed into a high octane naphtha fraction and saturated hydrocarbon product that exhibits low bromine number. This is accomplished in this system 10c by the addition of a naphtha separator 100, a second high rate reactor system 132 operated as a naphtha reformer, and product hydrotreaters 141,143. The organic product 34 from the high-rate hydrothermal reactor 32 may contain significant amounts of olefin, isoolefin, and cycloolefins compounds. For certain applications of this technology, the high olefin content can be further reformed as discussed below.

With continuing reference to FIG. 4, the naphtha portion 103 of the organic product 34 exiting from the naphtha separator 100 is fed into a second high-rate reactor 132 where it is reformed to produce a highly cyclized naphtha 105 and a reformer gas 107 that has a high hydrogen concentration such of 50 to 75%. The reformer gas 107 provides sufficient hydrogen to saturate olefins, isoolefins, and cycloolefins to the corresponding paraffin compounds. The organic product 109 from the naphtha separator 100 can be split via distillate separator 111 into a clean distillate stream 113 and a residuum recycle 115, which can be recycled back to the organic feed reservoir 16. Alternatively, the entire organic product 109 can be sent directly to a hydrotreater 143. The distillate separation step is beneficial for certain organic feedstocks for two reasons: first, recycling a portion of the residuum 115 permits tailoring of distillate product distribution and maximizes the liquid product yield, and second, potential catalyst poisons or foulants can be removed from the hydrocarbon product 109 before the distillate fraction 113 is sent to the hydrotreater 143. Refractory contaminants in the residuum recycle stream 115 can be removed via a slip stream as an asphaltic byproduct.

The hydrogen-rich reformer gas 107 and product distillate 113 are then fed to the distillate hydrotreater 143. Conventional nickel-moly catalysts in hydrotreater 143 saturates olefins at very mild conditions without opening naphthene rings or hydrogenating aromatic compounds. The high-quality reformer gas contains few impurities and may require little or no treatment before use in the hydrotreater 143. The saturated distillate product 125 exiting the distillate hydrotreater 143 has a very low bromine number representative of a thermally stable distillate with low olefin content.

The reformed naphtha 105 has higher-octane than straight-run naphtha 103. The reformed naphtha 105 contains aromatic, naphthene, and olefinic compounds. Olefins in naphtha are acceptable in gasoline and typical motor gasoline has a bromine number of about 30. Highly reactive olefins, such as dienes and cycloolefins are not desirable and can be removed via hydrotreating in hydrotreater 141. If reformed, high-octane naphtha will be provided as a separate product, such as a gasoline blending component, mild partial hydrotreating using conventional nickel-moly hydrotreating catalyst can be employed to saturate the reactive olefins and reduce the bromine number of the stabilized naphtha 151 to between 20 and 30. The hydrogen-rich reformer gas 107 contains sufficient hydrogen to saturate both the distillate product in distillate hydrotreater 143 and stabilize the naphtha in hydrotreater 141. The reformer gas 107 can be split to feed each hydrotreater 141, 143 in parallel or fed in series as depicted in FIG. 4. The naphtha 105 can be provided as a separate product, or combined with the distillate product 117 from distillate hydrotreater 143 to produce a synthetic crude oil. Alternatively, the reformed naphtha 105 and distillate 113 can be combined and hydrotreated in a single hydrotreater.

Figure 5:
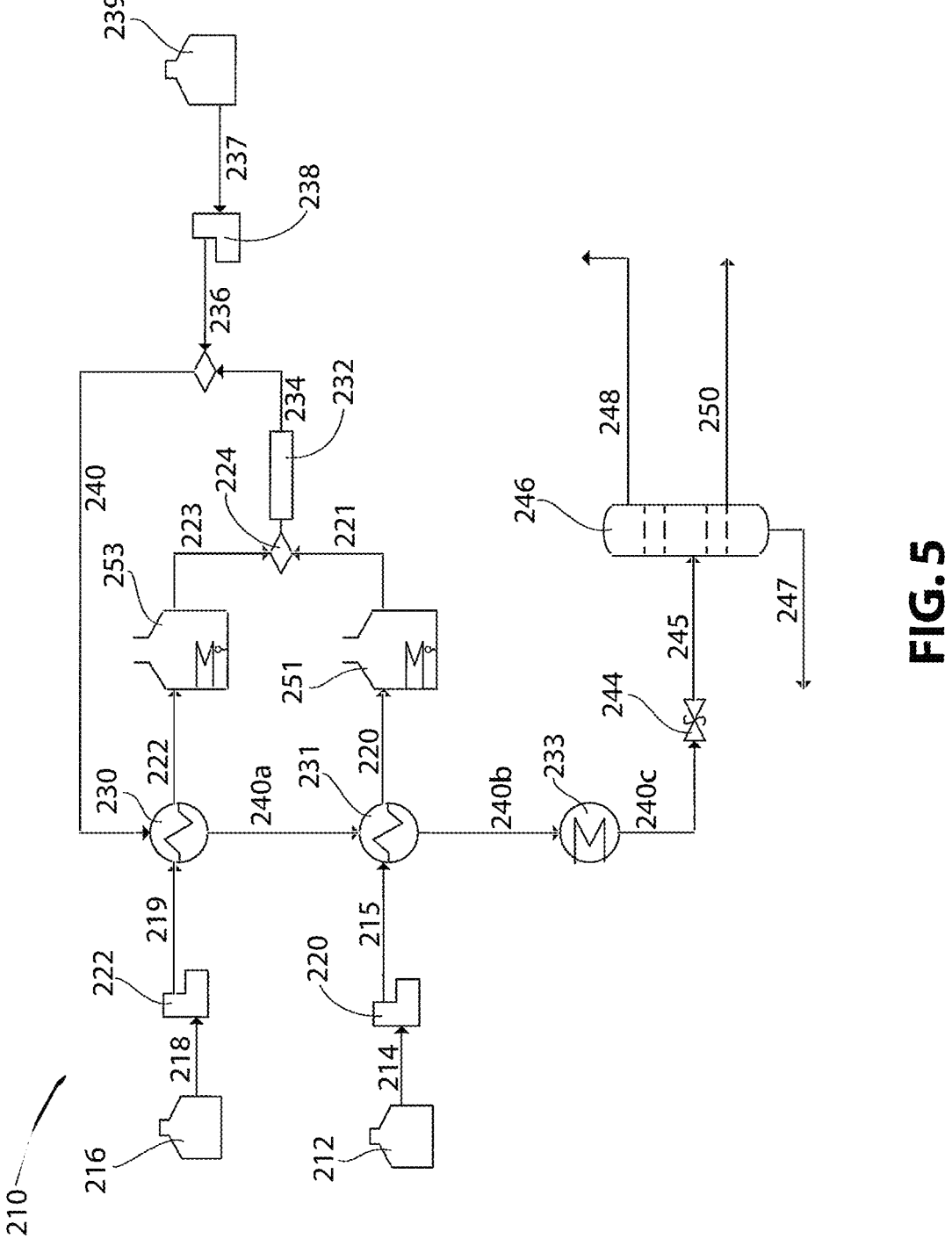
FIG. 5 is a schematic view of the high-rate reactor system using indirect heat in accordance with an embodiment of the present invention.

Reference is now made to FIG. 5 which shows a schematic view of the high-rate reactor system, generally indicated as 210, using indirect heat in accordance with an embodiment of the present invention. This system 210 is similar to the high-rate reactor system 10 of FIG. 1. The organic feedstock 214 and water feed 218, are supplied via organic supply reservoir 212 and water supply reservoir 216. The organic feedstock 214 and water feed 218 may be preheated to a temperature necessary to reduce viscosity and permit mixing and pumping operations. The organic feedstock 214 and water feed 218 can be pumped and/or pressurized via pumps 220, 222 in a selected proportion and pressurized to the initial system operating pressure to form pressurized organic stream 215 and pressurized water stream 219. The water stream 219 and organic stream 215 are further heated in one or more feed-effluent heat exchangers 230, 231 to a temperature that is below the condition at which conversion reactions are initiated to form heated water stream 222 and heated organic stream 220.

With continuing reference to FIG. 5, the heated water stream 222 and organic stream 220 are further heated by the application of direct heat such as by the use of direct fired or electrical heaters 251, 253. The further heated organic stream 221 is heated to a temperature that is below the condition at which conversion reactions are initiated, which is typically at a temperature less than 500° C., such as less than 400° C. The further heated water feed 220 is heated to form a superheated, supercritical water stream 223 which water is mixed in mixer 224 with the further heated organic stream 221, and then fed into the high rate reactor 232 where the mixed streams 221, 223 are provided sufficient time to react. It can be appreciated that the pressure and proportion of superheated, supercritical water can be controlled to attain the desired reaction time and temperature in the high rate reactor 232. In addition, it can be appreciated that mixing of the heated organic stream 221 and the super heated supercritical water stream 223 can be accomplished by any number of conventional operations such as direct addition, nozzles, eductors, and ejectors. The indirect heating achieved in system 210 avoids exposing the organic stream to high temperature reactor walls in the high rate reactor 232 which will reduce wall coking, achieve a near isothermal reactor temperature profile, increase overall conversion performance, reduce overall residence time, and provide more effective temperature control as compared to direct heating.

The volume ratio of superheated water 223 to organic material 221 can be between 1:5 and 3:1, such as 1:2 or 2:1.

The high-rate reactor design for this embodiment operates as an adiabatic reactor where no external heat is supplied other than the indirect heating described above. Product 234 from the high-rate reactor 232 may be immediately quenched by injecting pressurized water 236 wherein water 237 is supplied via water tank 239 and pressurized via pump 238. As stated above, quenching of the product 234 terminates conversion reactions and minimizes secondary cracking, coking, and gas formation. The quenched product 240 is then cooled and separated in a manner similar to the process shown in FIG. 1. The quenched product 240 passes through one or more feed-effluent heat exchangers 230, 231, and 233 to form streams 240a, 240b, and 240c. The pressure of the quenched and cooled product 240c can be reduced using depressurizing mechanic devices 244. The depressurized product 245 is then fed to separator 246 and the water 247 and the products of reaction 248 and 250 are separated. The water 247 can be recovered, treated if necessary, and reused. Fuel gas 248 and upgraded product organic product 240, are recovered and can be further processed using separation and refining unit operations.

EXAMPLES

Example 1: Renewable Feedstock

This example is directed to the conversion of triglyceride-type renewable oils into the precursors for renewable naphtha, jet and diesel fuels using the high-rate hydrothermal reactor. Renewable oils can be derived from plants, algae, or tallow and includes waste vegetable oil. The high-rate hydrothermal reactor process offers the unique benefits, compared to conventional conversion technologies such as hydrotreating, hydrocracking, and hydroisomerization processes, in that fatty acids are cracked and cyclized into alkyl cycloparaffin and alkyl aromatic compounds in addition to lower molecular weight iso- and normal paraffins. The conversion of renewable oil also produces organic acid byproducts that can be reduced to the corresponding paraffins by hydrogenation using conventional nickel-moly hydrotreating catalysts. Hydrotreating and fractionating renewable crude oil results in renewable naphtha, jet, and diesel fuels that exhibit chemical, physical, and combustion properties that are nearly identical to their petroleum counterparts.

This example was performed in a bench-scale continuous-flow, hydrothermal, high-rate reactor system in accordance with the present invention. The bench system designed capacity is 40 to 100 cc/min of renewable oil feedstock. The configuration and operation of the bench-scale system was similar to the process described in FIG. 1. In the bench-scale system, the high-rate reactor was heated electrically at a high rate. The reactor design resulted in Reynolds Numbers greater than 10,000 at the conditions tested. The optional quench of the reactor product stream was employed for this example. Reactor pressure was controlled using a pressure relief valve and gas production was measured using a wet test meter. Actual flow rates were measured and actual feed water ratios were calculated along with gas production rates, and Reynolds Numbers. Table 1 provides a summary of the test conditions.

TABLE 1

| High-Rate Reactor Conditions for Processing Plant Oil Operating Conditions | |
| --- | --- |
| Water to Organic (vol %) | 30-50 |
| Quench Water to Organic (vol %) | 20-30 |
| Average Reactor Temperature (° C.) | 510-530 |
| Average System Pressure (psig) | >3200 |
| Reactor Superficial Residence Time (seconds) | 55-65 |
| Reynolds Number | 11,000 |
| Gas Production Rate (scfb) | 300-400 |
| Conversion (%) | 50-80 |

The feedstock for this example was a rapeseed-like triglyceride oil consisting mostly of C18 fatty acids that included about 25% saturated and 75% unsaturated fatty acids. For renewable, triglyceride-type oils, conversion is defined as the percentage of the fatty acids that are cracked and cyclized into lower molecular weight compounds and it is determined by the percentage of fatty acids remaining in the synthetic crude oil product. In this example, overall conversion levels from 50 to 80% were achieved over the temperature range evaluated (500-530° C.). The goal in this example was to maximize diesel production which is best achieved at moderate conversion levels. Conversion levels well over 90% can be achieved, but may result in higher yields of off gas, naphtha and kerosene and lower yields of diesel. Byproduct gas analyses showed that it contained mostly C2-C6 hydrocarbons, carbon monoxide, carbon dioxide, and hydrogen. Carbon dioxide was generated via partial decarboxylation of the fatty acids. Hydrogen was generated from dehydrogenation of cycloparaffin and cycloolefin compounds to aromatic compounds.

Figure 6:
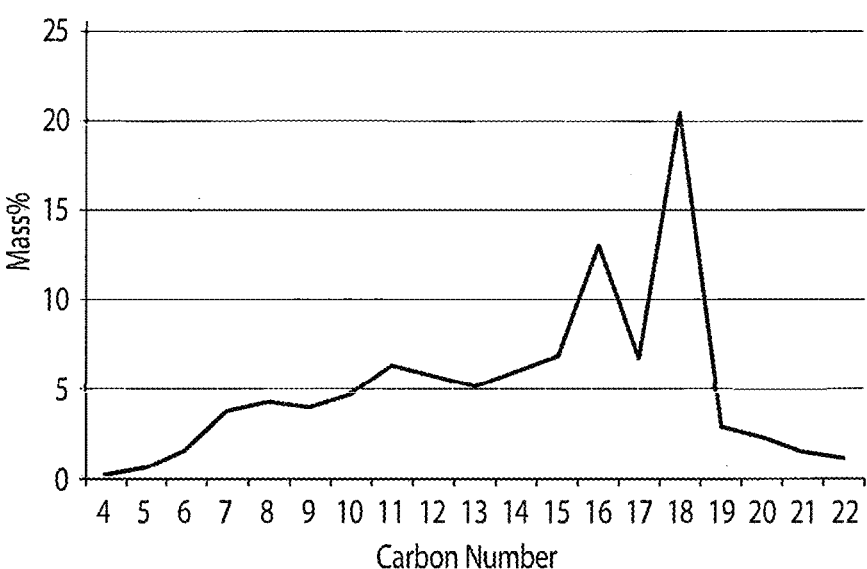
FIG. 6 shows the carbon number distribution of the whole hydrotreated product discussed in Example 1 in accordance with an embodiment of the present invention.
Figure 7:
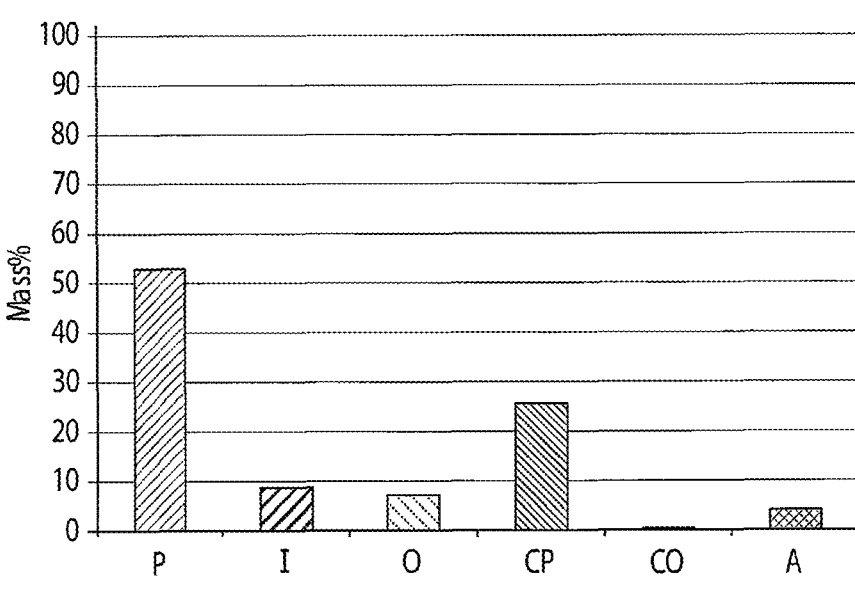
FIG. 7 shows the composition of the whole hydrotreated product by hydrocarbon type discussed in Example 1 in accordance with an embodiment of the present invention.

The product of the hydrothermal reactor in this example was hydrotreated using nickel-molybdenum catalyst to remove the remaining oxygen by conversion to water and saturate the olefin-double bonds that formed during cracking in the high rate reactor and to reduce the total acid number (TAN), which is a good measure of the residual oxygen content, from 166 to less than 0.2 or lower. After hydrotreating, the oxygen was removed to very low levels and most of the olefins were removed. FIG. 6 shows the carbon number distribution of the resultant whole hydrotreated product. This product distribution is desirable to achieve a high diesel yield. FIG. 7 provides the composition of the whole hydrotreated product by hydrocarbon type as determined by gas chromatography-mass spectroscopy (GC-MS) analysis. For purposes of the present description, "whole" refers to the entire hydrotreated product before distillation into specific fractions, i.e., naphtha, kerosene, diesel, VGO, and the like. Nearly 30% of the product consisted of cycloparaffin and aromatic compounds. Not only were cyclic compounds formed in the high-rate hydrothermal reactor, but cycloparaffin and aromatic compounds were retained during hydrotreating to remove organic acids and oxygen from synthetic crude oil.

With reference to FIG. 7, P refers to paraffin; I refers to isoparaffin; O refers to olefin; CP refers to cycloparaffin; CO refers to cycloolefin; and A refers to aromatic.

The hydrotreated oil was fractionated into naphtha, jet/kerosene, and diesel fractions. Table 2 provides a summary of the mass and volume yields by product type (with boiling point ranges for these particular fractions fractioned in the distillation unit). In addition, the renewable diesel produced easily met the ASTM D975 specification for a summer grade, ultra-low-sulfur, No. 2-D diesel fuel.

TABLE 2

| Product Yields for Plant Oil | | |
| --- | --- | --- |
| Fractionation Yield | Mass % | Volume % |
| Naphtha (30-135° C.) | 19.9 | 22.4 |
| Jet A (135-275° C.) | 30.6 | 30.5 |
| #2 Diesel (135-340° C.) | 70 | 69.4 |

Table 3 provides key diesel fuel properties. The high paraffin concentration of this diesel resulted in a relatively low specific gravity and high Cetane index. Sufficient cyclic isomers were formed to result in acceptable low-temperature properties.

TABLE 3

| Properties of Renewable Diesel from the High-Rate Hydrothermal Process | |
| --- | --- |
| Property | Value |
| Density | 0.7863 g/cc |
| Flash Point | 56° C. |
| Cloud Point | +1° C. |
| Pour Point | 0° C. |
| Viscosity @ 40° C. | 2.19 cSt |
| Cetane Index | 73.2 |

Figure 8:
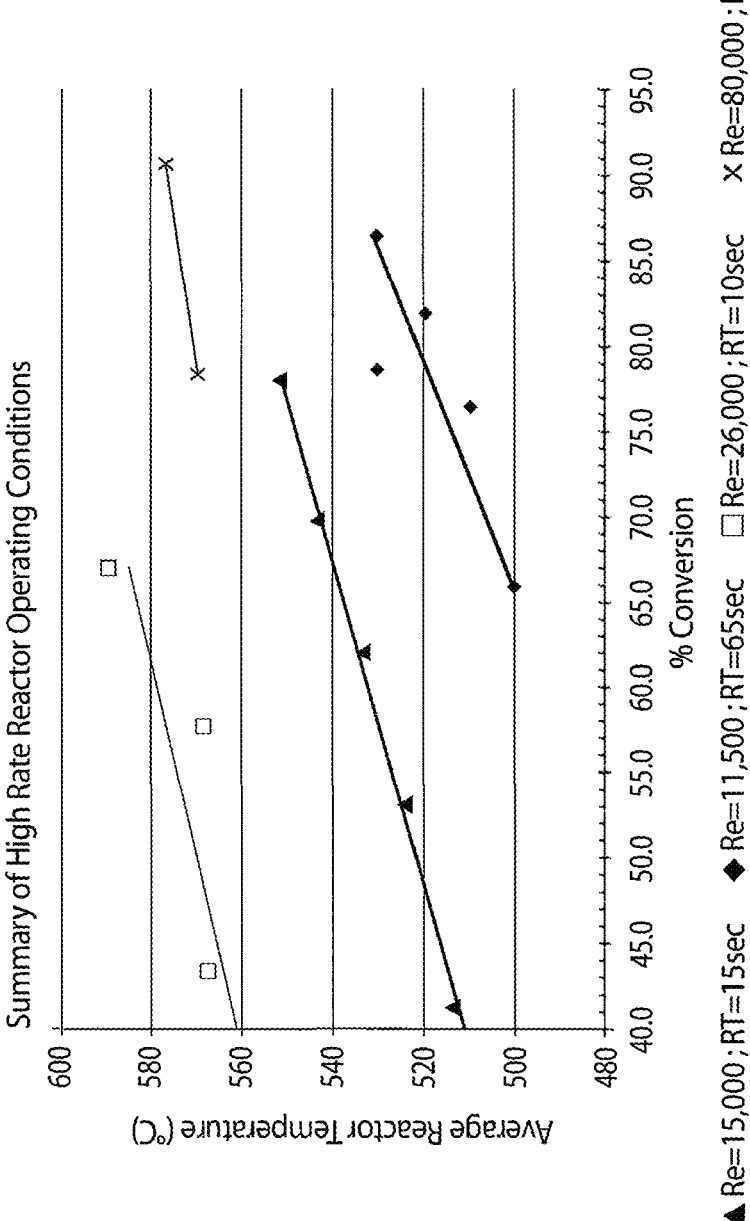
FIG. 8 shows a summary of high-rate reactor operating conditions from soy bean oil tests discussed in Example 1 in accordance with an embodiment of the present invention.

In addition, other types of renewable oils were upgraded to synthetic renewable crude oils via high-rate hydrothermal bench and pilot reactor systems. Soy bean oil (a surrogate feedstock) was tested over a broad range of operating conditions. Results from several soy bean oil tests are summarized in FIG. 8. All of these tests were conducted at operating pressures greater than 3200 psig and at feed water concentrations of 30-50% of the feed oil rate. Conversion rates, as previously defined, ranged from 40% to over 90%. Operating temperatures ranged from 500° C. to nearly 600° C. Residence times ranged from 7 seconds to 65 seconds. Reynolds Numbers ranged from 11,500 to 80,000. This summary demonstrated that the conversion rates are obtained over a broad range of conditions that can be varied to accommodate particular feedstocks or to meet product yield and specification requirements.

Example 2: Naphtha Feedstock

A bench-scale, continuous-flow, high-rate reactor system was fabricated and tested. The configuration of the bench-scale system is the same as FIG. 1. The naphtha feedstock was produced by the catalytic hydrothermolysis of plant oil, which was then hydrotreated and fractionated into naphtha, jet, and bottoms products. The feedstock properties are shown in Table 4. This feedstock contained 8% aromatic compounds, 19% cycloparaffin compounds, and over 68% normal paraffins. The naphtha feedstock was highly saturated and had a bromine number less than 1.0.

TABLE 4

Naphtha Feedstock

| | Mass Percentage of Naphtha Feed | | | | | |
|---|---|---|---|---|---|---|
| Carbon # | P | I | O | N | A | Total |
| 3 | 0.05 | 0.00 | 0.00 | 0.00 | 0.00 | 0.05 |
| 4 | 1.82 | 0.00 | 0.00 | 0.00 | 0.00 | 1.82 |
| 5 | 8.84 | 0.56 | 0.00 | 0.00 | 0.00 | 9.40 |
| 6 | 14.50 | 2.71 | 0.00 | 0.00 | 0.00 | 17.21 |
| 7 | 19.35 | 0.79 | 0.00 | 6.24 | 0.00 | 26.35 |
| 8 | 15.94 | 0.06 | 0.00 | 7.22 | 3.60 | 26.82 |
| 9 | 7.47 | 0.32 | 0.00 | 3.86 | 3.75 | 15.40 |
| 10 | 0.48 | 0.00 | 0.00 | 1.63 | 0.84 | 2.95 |
| | | | | | | |
| Total | 68.42 | 4.44 | 0.00 | 18.95 | 8.19 | 100.00 |
| 10 | 0.48 | 0.00 | 0.00 | 1.63 | 0.84 | 2.95 |
| | | | | | | |
| Total | 68.42 | 4.44 | 0.00 | 18.95 | 8.19 | 100.00 |

The feed pumps controlled the overall feed rate of the water and naphtha feed. The feed mixture was preheated by the feed-effluent heat exchanger before flowing into the high-rate, reforming reactor. The reactor system was designed to achieve Reynolds numbers greater than 10,000 at the conditions tested. The reactor was electrically heated to obtain high radiant heat flux and rapidly heat the feed mixture to the reaction temperature. Quench water was pumped directly into the reactor effluent stream immediately after the reactor to quench the reforming reactions. The product was further cooled by the feed-effluent heat exchanger and the product cooling heat exchanger. Pressure was reduced using a pressure relief valve and gas production was measured using a wet test meter. Table 5 provides a summary of test condition and results.

In this example the test objective was to demonstrate the effect of reactor average temperature and residence time on the degree of reforming and the ability to control the production of benzene. Four different conditions were evaluated and samples were collected at each condition and analyzed by GC-MS. The superficial residence time for conditions S5 and S6 was 64 seconds and for conditions S7 and S8 was 50 and 49 seconds, respectively. Actual flow rates were measured and actual feed water and quench water ratios were calculated along with gas production rates, superficial residence times, and Reynolds Numbers.

The normal paraffin concentration was reduced by approximately 50% in all cases. The total amount of cyclic compounds (cycloparaffins plus alkylbenzenes) approximately doubled from 27% in the naphtha feed to between 51 and 59% in the products. At condition S5 (570° C.) no benzene was formed and at condition S6 (581° C.) 4.7% benzene was formed. This demonstrated that significant reforming can be accomplished without production of benzene and benzene formation can be easily controlled by reactor temperature. The same results were evident at shorter residence time (conditions S6 and S7). At condition S6 (575° C.) no benzene was formed and at condition S7 (588° C.) 4.5% benzene was formed. The bromine numbers were relatively high indicating a significant amount of high-octane, olefinic compounds. If necessary, the bromine number (olefin concentration) can be reduced by very mild hydrotreating.

Analysis by GC-MS showed that the hydrocarbon portion of the byproduct gas formed during condition S5 was approximately 90% olefins. The olefin fraction contained approximately 23% propene, 35% isobutene, and a mixture of other linear and cycloolefins which is a very good feedstock for oligomerization in accordance with other embodiments of this invention that are shown in FIGS. 2 and 3.

TABLE 5

| Summary of Test Conditions and Results | | | | | |
|---|---|---|---|---|---|
| Test Condition | | S5 | S6 | S7 | S8 |
| Water Fraction | % | 30% | 30% | 31% | 31% |
| Organic Flow | mL/min | 50 | 50 | 64 | 65 |
| Water Flow | | 15 | 15 | 20 | 20 |
| W + O Flow | | 65 | 65 | 84 | 85 |
| Quench Water | | 12 | 12 | 12 | 12 |
| Reactor Temperature | ° C. | 570 | 581 | 575 | 588 |
| Avg Pressure | psig | 3300 | 3300 | 3300 | 3300 |
| Gas | sgfb | 795 | 1004 | 867 | 1272 |
| Reactor Superficial Residence Time | sec | 64 | 64 | 50 | 49 |
| Re (in reactor) | X1000 | 11 | 11 | 14 | 14 |
| Bromine Number | | 42 | 50 | 40 | 51 |
| n-Paraffins | wt % | 35.2 | 30.3 | 38.4 | 32.4 |
| I-Paraffins | wt % | 3.77 | 2.33 | 3.73 | 2.32 |
| Benzene | wt % | 0.0 | 4.7 | 0.0 | 4.5 |
| Naphthenes | wt % | 35.1 | 30.0 | 34.1 | 31.6 |
| Aromatics | wt % | 18.0 | 29.3 | 17.1 | 26.2 |
| | | | | | |
| Total Cyclics | wt % | 53.1 | 59.2 | 51.2 | 57.8 |

Figure 9:
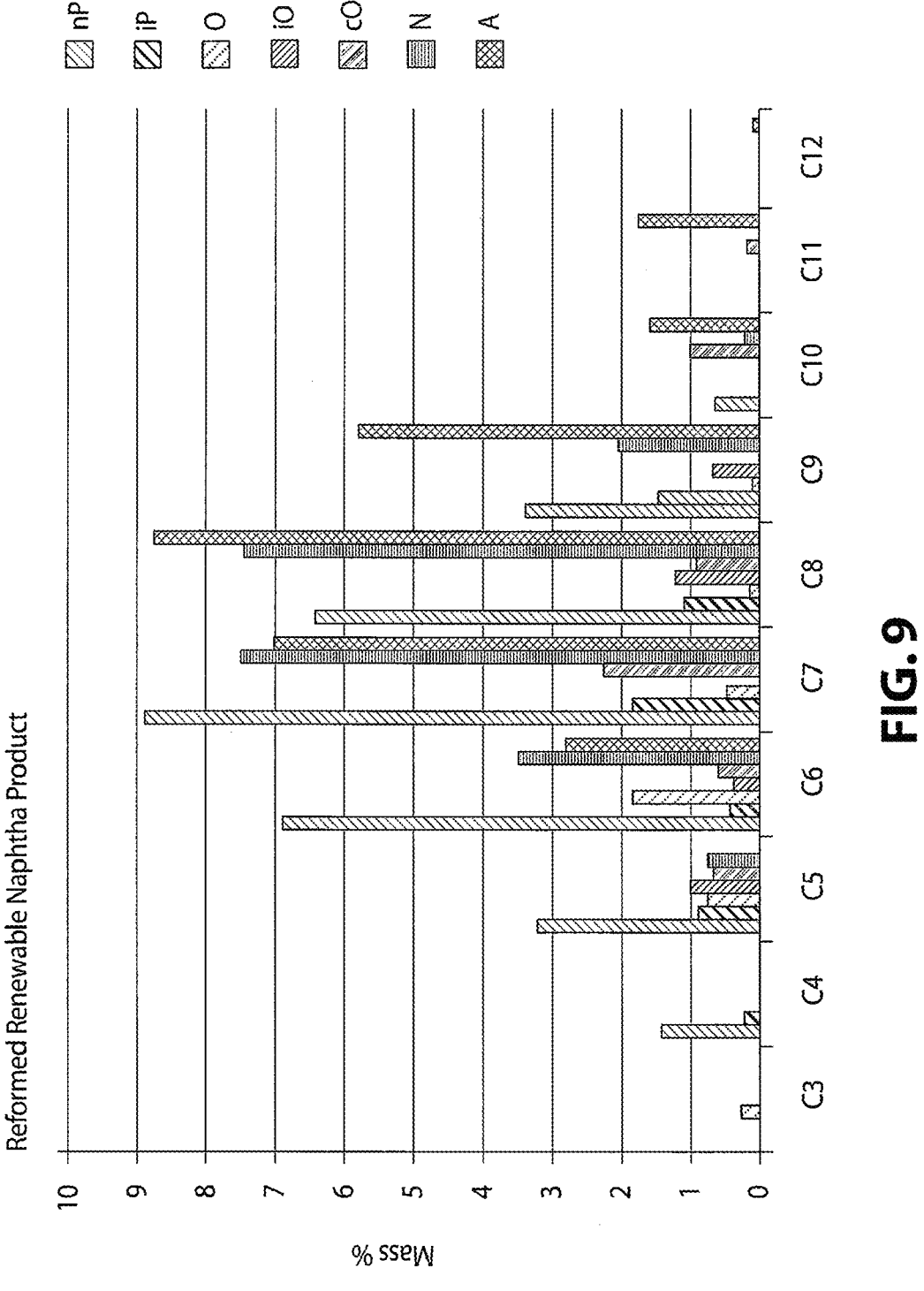
FIG. 9 shows the chemical composition of the reformed naphtha product discussed in Example 2 in accordance with an embodiment of the present invention.

Another test was performed to obtain samples of reformed naphtha for octane analysis. The same feedstock and similar process conditions were employed as discussed above. Product samples were collected and analyzed by GC-MS. FIG. 9 provides the chemical composition of the reformed naphtha product. In FIG. 9, np refers to n-paraffin; iP refers to isoparaffin; O refers to olefin; iO refers to isoolefin; cO refers to cycloolefin; N refers to naphthene/cycloparaffin; and A=aromatic. The normal paraffin concentration was reduced from 50% to about 30%. The aromatic concentration increased from 11% to about 28%. The naphthene composition decreased slightly and about 5% cycloolefins were formed. This indicates operation of a reforming mechanism where cycloolefins and naphthenes were formed from paraffins and olefins and which are then dehydrogenated to form the corresponding aromatic compounds.

The reformed naphtha was not hydrotreated and, therefore, was very unsaturated. This was demonstrated by the increase in bromine number from less than 2 to approximately 40 as shown in Table 6. The high bromine number is acceptable with respect to the value of the reformed naphtha as a gasoline blend stock because olefins generally exhibit a higher octane rating than the corresponding paraffin compounds and motor gasoline typically has a bromine number of about 30. If necessary, the reformed naphtha can be mildly hydrotreated to saturate the most reactive olefins (dienes, and cycloolefins) to produce a stabilized naphtha product. Octane improvement was clearly demonstrated as shown in Table 6. The research octane number (RON) increased over 17 points and the motor octane number (MON) increased 10 points.

TABLE 6

| Summary of Test Conditions and Results Physical Properties | | |
|---|---|---|
| | Feed | Product |
| Bromine Number | 1.6 | 40.5 |
| Specific Gravity | 0.710 | 0.728 |
| Research Octane Number (RON) | 49.9 | 67.6 |
| Motor Octane Number (MON) | 52.7 | 62.9 |
| (RON + MON)/2 | 51.3 | 65.3 |

Example 3: Fischer-Tropsch (FT) Wax

This example illustrates that the high-rate hydrothermal process can be used to convert Fischer-Tropsch (FT) wax into distillate products. There is special interest in small (less than 5000 barrels/day) FT systems for converting "stranded gas" or syngas into liquid product. While large commercial FT systems use hydrocracking to convert high-melting-point FT wax into distillate, hydrocracking is not attractive for small FT systems due to complexity and cost. Product from FT processes exhibits a broad range of molecular weight from light naphtha to C80+ waxes. Typically, the liquid fraction (smaller than C22) is separated from the wax and often the highest molecular weight waxes (larger than C50) are also separated for other applications. The FT wax used in this example is a distillate product that contains C20 to C55 waxes and is a commercially available product identified as IGI 1339A. An assay of the IGI 1339A wax was approximated using simulated distillation and the results shown in Table 7. About 96% of this FT wax boils above the diesel boiling range (over 650° F.), so it is apparent that the lighter fractions have already been removed. This wax is nearly 100% n-paraffin compounds.

TABLE 7

| FT Wax IGI 1339A Assay | | | | | | | |
|---|---|---|---|---|---|---|---|
| | IGI 1339A as received | Light Naphtha | Heavy Naphtha | Kerosene | Diesel | Vacuum Gas Oil | Resid |
| Cuts (° F.) | | 60 to 165 | 165 to 330 | 330 to 480 | 480 to 650 | 650-1000 | >1000 |
| Cuts (° C.) | | 15 to 74 | 74 to 166 | 166 to 249 | 249 to 343 | 343-538 | >538 |
| Sim Dis (D2887), mass % | | 0.0% | 0.0% | 0.7% | 3.3% | 81.8% | 14.2% |
| API Gravity | 54.7 | | | | | | |
| Specific Gravity (60/60 F.) | 0.75 | | | | | | |
| Melting Point, C. | 60-80 | | | | | | |

It is possible to crack 100% of the vacuum gas oil (VGO) and residuum in a single-pass operation; however, this approach is neither technically nor economically advantageous. During catalytic hydrocracking of FT wax one technique is to partially crack the VGO and residuum fraction, separate the distillate products from the uncracked material, and recycle the uncracked portion to accomplish more complete conversion. Attempts to convert all of the wax into distillate in a single step generally results in excessive secondary cracking to gases and light naphtha and more rapid catalyst deactivation will be observed. To maximize liquid distillate yield and minimize byproduct gas formation, reactor conditions were selected that resulted in partial conversion in a single pass.

The configuration and operation of the bench-scale system use for this example was similar to the process described in FIG. 1. In the bench-scale system, the high-rate hydrothermal reactor was heated electrically at a high rate. In this example, reactor Reynolds Numbers greater than 20,000 were achieved at the conditions tested. Reactor pressure was controlled using a pressure relief valve and gas production was measured using a wet test meter. Actual feed flow rates and gas production rates were measured and residence time and Reynolds Numbers were calculated. Table 8 provides a summary of the test conditions.

TABLE 8

| High-Rate Reactor Conditions for Upgrading FT Wax Operating Conditions | | |
|---|---|---|
| Water to Organic Ratio | vol. % | 50 |
| Average Reactor Temperature | ° C. | 535-545 |
| Average System Pressure | psig | >3200 |
| Reactor Superficial Residence Time | seconds | 30-40 |
| Reynolds Number | | 23,000 |
| Gas Production Rate | scfb | 200-300 |

Figure 10:
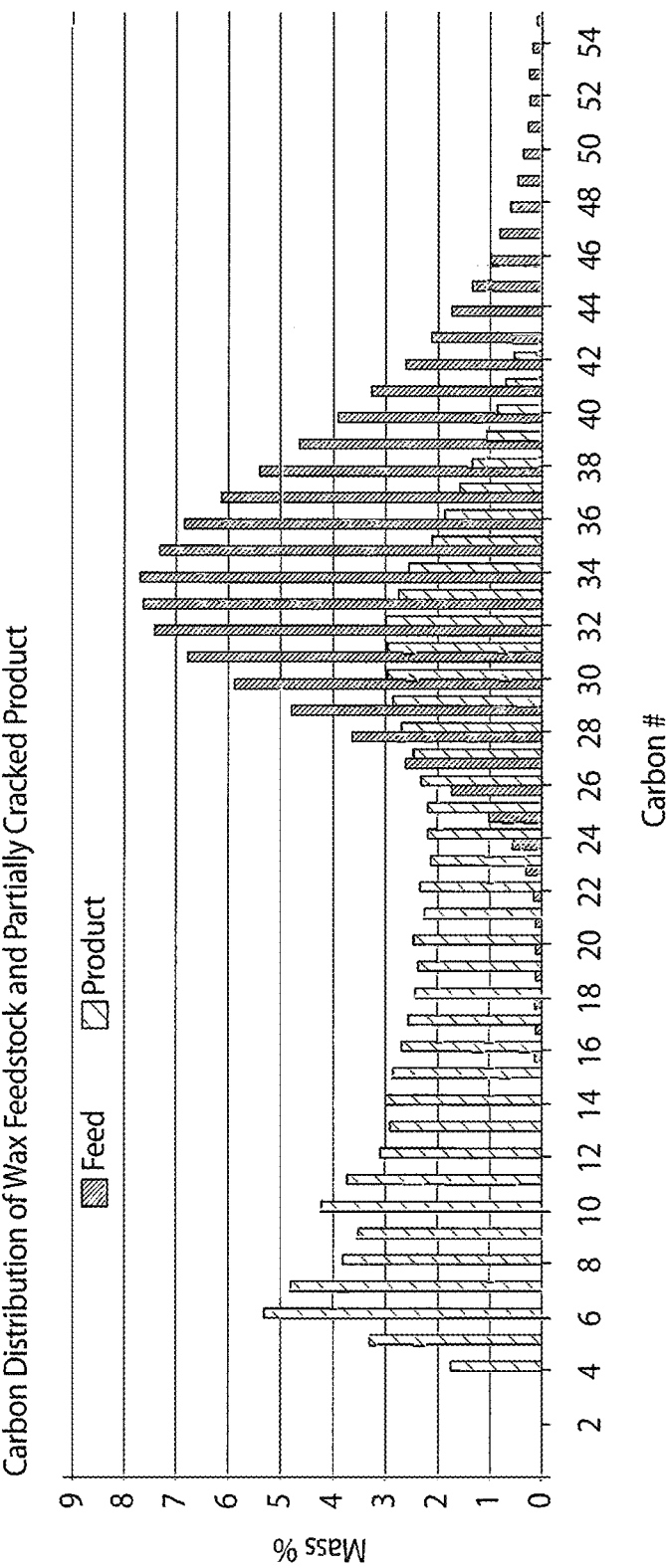
FIG. 10 shows the carbon distribution of a wax feedstock and the carbon distribution of a partially cracked product from the high-rate hydrothermal reactor discussed in Example 3 in accordance with an embodiment of the present invention.

FIG. 10 shows the carbon distribution of the IGI 1339A wax feedstock and the carbon distribution of a partially cracked product from the high-rate hydrothermal reactor. This graph provides a representation showing significant conversion of high molecular weight waxes to lower-molecular weight distillates.

An assay was performed on the FT wax product and the results provided in Table 9. The crude was characterized by fractionating into cuts that are typically used by the refining industry to characterize crude oils. Each cut temperature and volume as determined by ASTM D2887 simulated distillation is provided in Table 9. The FT wax product was also fractionated by ASTM D2892 distillation. The light and heavy naphtha fractions were combined and the kerosene and diesel fractions were combined for further analysis.

TABLE 9

| | Light Naphtha | Heavy Naphtha | Kerosene | Diesel | Vacuum Gas Oil | Resid |
|---|---|---|---|---|---|---|
| FT Wax Product Assay | | | | | | |
| Cuts (° F.) | 60 to 165 | 165 to 330 | 330 to 480 | 480 to 650 | 650-1000 | >1000 |
| Cuts (° C.) | 15 to 74 | 74 to 166 | 166 to 249 | 249 to 343 | 343-538 | >538 |
| Sim Dis (D2887), mass % | 7.4% | 13.8% | 14.8% | 18.4% | 45.1% | 0.6 |
| API Gravity | 65.9 | | 50.4 | | | |
| Specific Gravity (60/60 F.) | 0.717 | | 0.778 | | | |
| nParaffins, wt % (by GC-MS) | 22.2 | | 25.8 | | | |
| isoParaffins, wt % (by GC-MS) | 0.5 | | 0.0 | | | |
| Naphthenes, wt % (by GC-MS) | 7.9 | | 1.6 | | | |
| Aromatics, wt % (by GC-MS) | 0.3 | | 0.0 | | | |
| Olefins, wt % (by GC-MS) | 59.2 | | 70.1 | | | |
| IsoOlefins, wt % (by GC-MS) | 1.5 | | 1.4 | | | |
| CycloOlefins, wt % (by GC-MS) | 8.6 | | 0.7 | | | |

The conversion objective of partial cracking was clearly demonstrated. The VGO and residuum fraction was reduced from 96% of the feed to 45.7% of the product, i.e., a 52% reduction, with 21.2% of the product being naphtha and 33.2% of the product in the kerosene and diesel boiling range.

The hydrocarbon type analysis in Table 9 shows the formation of a significant amount of olefins and some isoolefins and cycloolefins. The formation of naphthene and aromatic compounds was low for this example at the conditions tested. For certain applications of this technology, high olefin content of the upgraded product can be converted to paraffins by additional processing in accordance another embodiment of this invention as depicted in FIG. 4 using the integrated high-rate, reformer with hydrotreating. In the integrated reformer embodiment of this invention, a portion of the naphtha is reformed to produce a highly cyclized naphtha and a reformer gas that has a high hydrogen concentration (50 to 75%). The reformer gas can easily provide sufficient hydrogen to saturate olefins, isoolefins, and cycloolefins to the corresponding paraffin compounds. Conventional nickel-moly catalysts will saturate olefins at very mild conditions without opening naphthene rings or hydrogenating aromatic compounds.

Example 4: Yellow Wax Crude Oil

This example demonstrates that the high-rate hydrothermal process can be used to reduce the pour point of a waxy crude oil such as yellow wax from the Uintah Basin in Utah. Waxy crude oils exhibit high pour points and, therefore, must be transported in heated tankers or rail cars and cannot be put into unheated crude pipelines. This example was performed in a bench-scale continuous-flow, hydrothermal, high-rate reactor system. The bench system designed capacity was 40 to 100 cc/min of organic feedstock. The configuration and operation of the bench-scale system was similar to the process described in FIG. 1. In the bench-scale system, the high-rate reforming reactor was heated electrically at a high rate. The reactor design resulted in Reynolds Numbers greater than 10,000 at the conditions tested. Reactor pressure was controlled using a pressure relief valve and gas production was measured using a wet test meter. Actual flow rates were measured and actual feed water ratios were calculated along with gas production rates, and Reynolds Numbers. Table 10 provides a summary of the test conditions.

TABLE 10

High-Rate Reactor Conditions for Upgrading Yellow Wax Operating Conditions

| | |
|---|---|
| Water to Organic Ratio (vol %) | 50-60 |
| Average Reactor Temperature (° C.) | 530-550 |
| Average System Pressure (psig) | >3200 |
| Reactor Superficial Residence Time (seconds) | 65-70 |
| Reynolds Number | 11,000 |
| Gas Production Rate (scfb) | 200-300 |

The yellow wax oil was highly paraffinic and solid at ambient conditions. An assay was performed on the yellow wax crude and the results are provided in Table 11. The crude was characterized by fractionating into cuts that are typically used by the refining industry to characterize crude oils. Each cut temperature and volume as determined by ASTM D2892 distillation is provided in Table 11. About 60% of the yellow wax crude was characterized as vacuum gas oil (VGO) and residuum (resid) and only 40% was characterized as "distillate." Even though this crude had an API gravity of 43, much higher than most petroleum crude oils, the VGO and residuum content was also much higher due to the high concentration of high molecular weight paraffin waxes. Therefore, the pour point of the whole crude is also very high, 42° C., which is well above ambient temperature and much higher than the pour point of typical petroleum crude oils.

TABLE 11

Yellow Wax Crude Assay

| | Whole crude | Light Naphtha | Heavy Naphtha | Kerosene | Gasoil/ Diesel | VGO | Resid |
|---|---|---|---|---|---|---|---|
| Cuts (° F.) | | 60 to 165 | 165 to 330 | 330 to 480 | 480 to 650 | 650-1000 | >1000 |
| Cuts (° C.) | | 15 to 174 | 74 to 166 | 166 to 249 | 249 to 343 | 343-538 | >538 |
| Cut volume (D2892), % | | 1.6% | 9.3% | 11.2% | 17.9% | 60.1% | |

TABLE 11-continued

| | Whole crude | Light Naphtha | Heavy Naphtha | Kerosene | Gasoil/ Diesel | VGO | Resid |
|---|---|---|---|---|---|---|---|
| | | | Yellow Wax Crude Assay | | | | |
| API Gravity | 42.8 | 82.2 | 61.8 | 51.3 | 45.2 | | |
| Specific Gravity (60/60 F.) | 0.812 | 0.662 | 0.732 | 0.774 | 0.801 | | |
| Vicosity at 40 C./104 F., cSt | | | | 1.27 | 3.56 | | |
| Cetane Index (D976) | | | | 61.7 | 713 | | |
| Pour point, C. | 42 | | | | 6 | | |
| Cloud point, C. | | | | | 10 | | |
| Freeze point, C. | | | | −33.0 | | | |
| nParaffins, wt % (by GC-MS) | >70 | 47.3 | 40.9 | 56.4 | 73.2 | | |
| isoParaffins, wt % (by GC-MS) | | 36.1 | 22.1 | 25.7 | 22.3 | | |
| Naphthenes, wt % (by GC-MS) | | 13.7 | 16.4 | 10.2 | 3.6 | | |
| Aromatics, wt % (by GC-MS) | | 2.9 | 10.5 | 6.3 | 0.3 | | |
| Olefins, wt % (by GC-MS) | | | 0.2 | 0.4 | 0.2 | | |
| IsoOlefins, wt % (by GC-MS) | | | 0.7 | | 0.3 | | |
| CycloOlefins, wt % (by GC-MS) | | | | | | | |

After processing the yellow wax crude oil in the high-rate hydrothermal reactor at the conditions identified in Table 10, 50% of the VGO and residuum fraction was converted into lower-boiling distillates including naphtha, kerosene, and diesel. In addition, the pour point of the whole product was reduced from 42° C. to −6° C. while the API gravity increased from 43° to 51°. Table 12 reports an assay of the upgraded product that shows that high molecular weight waxes were cracked into naphtha, kerosene, and diesel fractions. Also, the properties of the kerosene and diesel fractions after upgrading are greatly improved. The upgraded kerosene fraction meets jet fuel specific gravity and freezing point specification requirements, whereas the straight-run kerosene did not. Likewise, the upgraded diesel fraction exhibited cloud point and pour point values that are 10° C. lower than the corresponding straight-run diesel.

can be reduced using the integrated high-rate, hydrothermal naphtha reformer as described and shown in FIG. 4. In the integrated reformer embodiment of this invention, a portion of the naphtha is reformed to produce a highly cyclized naphtha and a reformer gas that has a high hydrogen concentration (50 to 75%). The reformer gas can easily provide sufficient hydrogen to saturate olefins, isoolefins, and cycloolefins to the corresponding paraffin compounds. Conventional nickel-moly catalysts can saturate olefins at very mild conditions without opening naphthene rings or hydrogenating aromatic compounds. The high-quality reformer gas contains few impurities and requires little or no treatment before use. The benefits of this approach include: 1) upgraded product with a very low bromine number, 2) high quality naphtha that exhibits higher-octane numbers

TABLE 12

| | Upgraded Product | Light Naphtha | Heavy Naphtha | Kerosene | Gasoil/ Diesel | VGO | Resid |
|---|---|---|---|---|---|---|---|
| | | | Upgraded Yellow Wax Assay | | | | |
| Cuts (° F.) | | 60 to 165 | 165 to 330 | 330 to 480 | 480 to 650 | 650-1000 | >1000 |
| Cuts (° C.) | | 15 to 174 | 74 to 166 | 166 to 249 | 249 to 343 | 343-538 | >538 |
| Cut volume (D2892), % | | 9.6% | 23.1% | 18.4% | 19.0% | 29.9% | |
| API Gravity | 50.6 | 82.6 | 60.0 | 48.8 | 41.9 | | |
| Specific Gravity (60/60 F.) | 0.777 | 0.661 | 0.739 | 0.785 | 0.816 | | |
| Vicosity at 40 C./104 F., cSt | 1.71 | | | 1.37 | 3.34 | | |
| Cetane Index (D976) | | | | 54.3 | 64.7 | | |
| Pour point, C. | −6 | | | −52 | −3 | | |
| Cloud point, C. | | | | −46 | −1 | | |
| Freeze point, C. | | | | −45 | | | |
| nParaffins, wt % (by GC-MS) | | 30.4 | 24.4 | 36.5 | 50.9 | | |
| isoParaffins, wt % (by GC-MS) | | 8.0 | 8.6 | 12.3 | 11.5 | | |
| Naphthenes, wt % (by GC-MS) | | 16.7 | 16.4 | 8.2 | 3.4 | | |
| Aromatics, wt % (by GC-MS) | | 0.0 | 9.6 | 7.0 | 1.2 | | |
| Olefins, wt % (by GC-MS) | | 28.6 | 28.2 | 32.7 | 30.0 | | |
| IsoOlefins, wt % (by GC-MS) | | 6.7 | 4.1 | 2.5 | 2.6 | | |
| CycloOlefins, wt % (by GC-MS) | | 9.7 | 8.8 | 0.7 | 0.0 | | |

The hydrocarbon type analysis in Table 12 shows the formation of a significant amount of olefins, isoolefins, and cycloolefins. High olefin content of the upgraded product than straight-run naphtha, 3) products with maximized hydrogen content, 4) reduction in fuel gas production, and 5) elimination of the need for on-site hydrogen generation.

Example 5: Atmospheric Gas Oil

The high-rate hydrothermal process of the present invention was used to upgrade AGO (Atmospheric Gas Oil) sufficiently to increase overall naphtha, and distillate yields. Refinery capacity and profitability are strongly tied to and limited by the volume of the crude oil that can be refined. Many refineries are limited by their ability to process AGO and vacuum gas oil (VGO) into distillate products. Standard industry practice is to crack AGO and in a hydrocracker or a Fluidized Catalytic Cracker (FCC). If processed by hydrocracking, the AGO or VGO may have to be hydrotreated first to remove impurities that will deactivate hydrocracking catalysts. The high-rate hydrothermal process of the present invention provides a hydrocracking alternative that is less sensitive to contaminants (sulfur, nitrogen, oxygen, metals, etc.), smaller, lower capital cost, and does not require hydrogen or hydrocracking catalysts.

This example was performed in a bench-scale continuous-flow, hydrothermal, high-rate reactor system. The bench system designed capacity was 40 to 100 cc/min of organic feedstock. The configuration and operation of the bench-scale system was similar to the embodiment of this invention described in FIG. 1. In the bench-scale system, the high-rate reactor was heated electrically at a high rate. The reactor design resulted in Reynolds Numbers greater than 10,000 at the conditions tested with quenching. Reactor pressure was controlled using a pressure relief valve and gas production was measured using a wet test meter. Actual flow rates were measured and actual feed water ratios were calculated along with gas production rates, and Reynolds Numbers. Table 13 provides a summary of the test conditions.

TABLE 13

| High-Rate Reactor Conditions for Upgrading AGO Operating Conditions | |
| --- | --- |
| Water to Organic (vol %) | 50-100 |
| Quench Water to Organic (vol %) | 20-40 |
| Average Reactor Temperature (° C.) | 540-560 |
| Average System Pressure (psig) | >3200 |
| Reactor Superficial Residence Time (seconds) | 60-70 |
| Reynolds Number | 11,000 |
| Gas Production Rate (scfb) | 200-300 |

Analytical results for the AGO feed tested are summarized in Table 14. In addition to viscosity and density, the AGO distillate was characterized by simulated distillation. Accordingly, to ASTM D2887, most of the AGO (87%) boiled above the diesel cut point of 650° F. which is typical for AGO. The API gravity was relatively low at 24.3° and the viscosity was high at 20.4 cSt.

TABLE 14

| | Assay of AGO as Received | | | | | | |
| --- | --- | --- | --- | --- | --- | --- | --- |
| | AGO as received | Light Naphtha | Heavy Naphtha | Kerosene | Diesel | VGO | Resid |
| Cuts (° F.) | | 60 to 165 | 165 to 330 | 330 to 480 | 480 to 650 | 650-1000 | >1000 |
| Cuts (° C.) | | 15 to 174 | 74 to 166 | 166 to 249 | 249 to 343 | 343-538 | >538 |
| Sim Dis (D2887), mass % | | 0.2% | 0.6% | 2.5% | 9.4% | 57.9% | 29.4% |
| API Gravity | 24.3 | | | | | | |
| Specific Gravity (60/60 F.) | 0.908 | | | | | | |
| Vicosity at 40 C./104 F., cSt | 20.4 | | | | | | |

Table 15 provides a partial assay of the upgraded AGO after processing in the high-rate hydrothermal reactor. A significant amount of cracking was evident at the conditions tested. The fraction of the over 650° F. oil was reduced from 87% to 56.3%, which was a 35% reduction from the starting amount. In addition the API gravity of the product increased from 24.3 to 28.6° and the viscosity was reduced from 20.4 to 1.8 cSt. The naphtha, kerosene and diesel yield increased proportionally. This example demonstrates the potential or the high-rate hydrothermal reactor process as an alternative to hydrocracking for AGO and other refinery intermediate streams.

TABLE 15

| | Partial Assay of Upgraded AGO | | | | | | |
| --- | --- | --- | --- | --- | --- | --- | --- |
| | Upgraded AGO | Light Naphtha | Heavy Naphtha | Kerosene | Diesel | VGO | Resid |
| Cuts (° F.) | | 60 to 165 | 165 to 330 | 330 to 480 | 480 to 650 | 650-1000 | >1000 |
| Cuts (° C.) | | 15 to 174 | 74 to 166 | 166 to 249 | 249 to 343 | 343-538 | >538 |
| Sim Dis (D2887), mass % | | 2.8% | 1.32% | 12.3% | 15.4% | 31.0% | 25.3% |
| API Gravity | 28.6 | | | | | | |
| Specific Gravity (60/60 F.) | 0.884 | | | | | | |

TABLE 15-continued

| | | | Partial Assay of Upgraded AGO | | | |
|---|---|---|---|---|---|---|
| Upgraded AGO | Light Naphtha | Heavy Naphtha | Kerosene | Diesel | VGO | Resid |
| Vicosity at 40 C./104 F., cSt | 1.8 | | | | | |

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of this description. For example, it is to be understood that the present invention contemplates that, to the extent possible, one or more features of any embodiment can be combined with one or more features of any other embodiment.

The invention claimed is:

1. A process for upgrading an organic feedstock comprising:

providing a feed stream mixture by combining an organic feedstock stream and a water stream, wherein the water stream and organic feedstock stream are combined at a water-to-organic feed volume ratio between 1:100 and 1:1 to form the feed stream mixture, wherein the feed stream mixture is pressurized to an entry pressure and heated to an entry temperature of less than 400° C., wherein the organic feedstock stream comprises plastics;

feeding the feed stream mixture into a high-rate reactor;

heating the feed stream mixture at a rate of 10-50° C. per second within the high-rate reactor to a reaction temperature at supercritical water conditions, wherein the entry temperature of the feed stream mixture is less than the reaction temperature of the feed stream mixture;

maintaining the reaction temperature at supercritical water conditions of the feed stream mixture in the high-rate reactor for a residence time resulting in a reactor effluent comprising upgraded hydrocarbon distillate products, wherein the feed stream mixture is maintained at a Reynolds number of at least 11,000;

quenching the reactor effluent by direct injection of water in a volume ratio of 1:10 to 2:1 to terminate conversion reactions; and recovering the upgraded hydrocarbon distillate products.

2. The process of claim 1, further comprising, injecting a pressurized quench stream into the feed stream mixture when the feed stream mixture exits the high-rate reactor to terminate a conversion reaction of the feed stream mixture, resulting in a quenched mixture, wherein the quenched mixture passes through one or more feed-effluent heat exchangers to further cool the quenched mixture.

3. The process of claim 2, further including passing the quenched mixture from the one or more feed-effluent heat exchangers to a product cooling heat exchanger to cool the quenched mixture to a temperature suitable for separation.

4. The process of claim 1, wherein the entry pressure is within a range of 1500 to 6000 psig.

5. The process of claim 1, wherein the reaction temperature of the feed stream mixture in the high-rate reactor is 400-700° C.

6. The process of claim 1, wherein the organic feedstock further comprises synthetic hydrocarbons.

7. The process of claim 6, wherein the synthetic hydrocarbons comprise hydrocarbons produced from one or more of a Fischer-Tropsch process, an alkylation process, an oligomerization process, a polymerization process, or a biosynthetic process.

8. The process of claim 6, wherein the synthetic hydrocarbons comprise organic components.

9. The process of claim 1, wherein the organic feedstock stream further comprises crude oils exhibiting API gravities greater than 22°, waxy crude oils comprising yellow wax and/or black wax, and mixtures thereof.

10. The process of claim 1, wherein the organic feedstock stream further comprises renewable plant oil comprising canola, soybean, Carinata, and castor; waste vegetable oil; corn oil derived from distillers grains; animal tallow; algal oil; microbial oil; terpenes and other pine-related byproducts from tall oils; biosynthetic oils, and mixtures thereof.

11. The process of claim 1, wherein the organic feedstock stream further comprises natural gas liquids, natural gasoline, petroleum ether, light naphtha, heavy naphtha, kerosene, diesel, atmospheric gas oil, light crude oil, waxy crude oil, and mixtures thereof; that are reformed in the high-rate reactor into highly naphthenic and aromatic distillates, higher-octane naphtha and byproduct reformer gas containing hydrogen that may be used for hydrotreating other product streams.

12. The process of claim 1, wherein olefinic gas is a by-product of a conversion reaction within the high-rate reactor, the process further comprising converting the olefinic gas to high-octane naphtha and/or heavier hydrocarbons by one of alkylation or oligomerization.

13. The process of claim 1, wherein the feed stream mixture has a turbulent flow with a Reynolds number greater than 50,000 within the high-rate reactor.

14. The process of claim 13, further comprising maintaining the turbulent flow with the Reynolds number of greater than 50,000 within the high-rate reactor for the residence time of less than 60 seconds.

15. The process of claim 1, wherein the residence time is less than 60 seconds.

16. A process for upgrading an organic feedstock comprising:

providing an organic feedstock stream comprising synthetic hydrocarbons obtained from a polymerization process;

providing a water mixture;

applying heat and pressure to the water mixture to form a superheated or supercritical water stream;

mixing the superheated or supercritical water stream with the organic feedstock stream to form a feed stream mixture;

feeding the feed stream mixture into a high-rate reactor at a high velocity to achieve a turbulent flow with a high Reynolds Number of at least 11,000 within the high-rate reactor, wherein the feed stream mixture enters the high-rate reactor at an entry temperature that is below a reaction temperature;

rapidly heating the feed stream mixture at a rate of 10-50° C. per second within the high-rate reactor to the reaction temperature at supercritical water conditions;

maintaining the reaction temperature, pressure, and Reynolds Number of the feed stream mixture in the high-rate reactor for a residence time of 1-120 seconds to achieve thermal equilibrium and cause organic components of the feed stream mixture to undergo a conversion reaction resulting in higher-value products;

injecting a pressurized quench stream into the feed stream mixture when the feed stream mixture exits the high-rate reactor to terminate the conversion reaction of the feed stream mixture, resulting in a quenched mixture;

feeding the quenched mixture through one or more feed-effluent heat exchangers to further cool the quenched mixture;

feeding the quenched mixture from the one or more feed-effluent heat exchangers through a product cooling heat exchanger to cool the quenched mixture to a temperature suitable for separation;

depressurizing the quenched mixture upon exiting the product cooling heat exchanger;

feeding the quenched mixture into a separator that separates the quenched mixture into water and one or more products of reaction, wherein the water from the quenched mixture is recycled into a water supply source for supplying the water mixture, the pressurized quench stream, or both; and separating the one or more products of reaction into at least a fuel gas and upgraded hydrocarbon distillate products.

17. The process of claim 16, wherein the organic feedstock stream further comprises crude oils exhibiting API gravities greater than 22°, waxy crude oils comprising yellow wax and/or black wax, and mixtures thereof.

18. The process of claim 16, wherein the organic feedstock stream further comprises renewable plant oil comprising canola, soybean, Carinata, and castor; waste vegetable oil; corn oil derived from distillers grains; animal tallow; algal oil; microbial oil; terpenes and other pine-related byproducts from tall oils; biosynthetic oils, and mixtures thereof.

19. The process of claim 16, wherein the organic feedstock stream further comprises natural gas liquids, natural gasoline, petroleum ether, light naphtha, heavy naphtha, kerosene, diesel, atmospheric gas oil, light crude oil, waxy crude oil, and mixtures thereof; that are reformed in the high-rate reactor into highly naphthenic and aromatic distillates, higher-octane naphtha and byproduct reformer gas containing hydrogen that may be used for hydrotreating other product streams.

20. The process of claim 16, wherein maintaining the reaction temperature, pressure, and Reynolds Number of the feed stream mixture in the high-rate reactor includes maintaining the Reynolds number of at least 50,000 throughout high-rate reactor.

* * * * *